(12) United States Patent
Kim et al.

(10) Patent No.: US 11,076,080 B2
(45) Date of Patent: Jul. 27, 2021

(54) UNDER-DISPLAY IMAGE SENSOR FOR EYE TRACKING

(71) Applicant: Synaptics Incorporated, San Jose, CA (US)

(72) Inventors: Kio Kim, San Francisco, CA (US); Boyan Ivanov Bonev, Santa Clara, CA (US); Andrew Lek, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 16/704,523

(22) Filed: Dec. 5, 2019

(65) Prior Publication Data

US 2021/0176383 A1 Jun. 10, 2021

(51) Int. Cl.
H04N 5/225 (2006.01)
H04N 5/232 (2006.01)
G06F 3/01 (2006.01)

(52) U.S. Cl.
CPC ........... *H04N 5/2257* (2013.01); *G06F 3/013* (2013.01); *H04N 5/23229* (2013.01)

(58) Field of Classification Search
CPC ............. H04N 5/2257; H04N 5/23229; H04N 5/225–2257; G06F 3/013
See application file for complete search history.

(56) References Cited

U.S. PATENT DOCUMENTS

| | | | |
|---|---|---|---|
| 5,667,474 A | 9/1997 | Nishimura | |
| 6,798,406 B1 | 9/2004 | Jones et al. | |
| 7,239,909 B2 | 7/2007 | Zeman | |
| 8,937,646 B1 | 1/2015 | Baldwin | |
| 9,188,662 B2 | 11/2015 | You et al. | |
| 9,317,243 B2 | 4/2016 | Becze | |
| 9,377,623 B2 | 6/2016 | Robbins et al. | |
| 9,638,511 B2 | 5/2017 | Boppart et al. | |
| 9,953,214 B2 | 4/2018 | Yin et al. | |
| 9,977,960 B2 * | 5/2018 | Gustafsson | G06F 3/013 |
| 10,120,442 B2 | 11/2018 | Liu et al. | |
| 10,148,918 B1 | 12/2018 | Seiger et al. | |
| 10,491,885 B1 | 11/2019 | Hicks | |

(Continued)

FOREIGN PATENT DOCUMENTS

| | | |
|---|---|---|
| CN | 105094307 A | 11/2015 |
| CN | 109188711 A | 1/2019 |

(Continued)

OTHER PUBLICATIONS

International Search Report and Written Opinion dated Feb. 24, 2021, issued in International Application No. PCT/US2020/059367, filed Nov. 6, 2020, 11 pages.

(Continued)

*Primary Examiner* — Temesghen Ghebretinsae
*Assistant Examiner* — Ivelisse Martinez Quiles
(74) *Attorney, Agent, or Firm* — Paradice & Li LLP

(57) ABSTRACT

A method for eye tracking is disclosed. The method may include receiving a first image captured by a first camera based at least in part on reflections of light emitted by a light source. The reflections may be partially occluded by an electronic display disposed in front of the first camera. The method may further include detecting an eye of a user in the partially occluded first image and determining a position or orientation of the eye relative to the electronic display.

22 Claims, 22 Drawing Sheets

(56) References Cited

U.S. PATENT DOCUMENTS

| | | | |
|---|---|---|---|
| 10,606,349 B1* | 3/2020 | Ouderkirk | G02B 27/0093 |
| 2004/0263786 A1 | 12/2004 | Williams et al. | |
| 2006/0010400 A1 | 1/2006 | Dehlin et al. | |
| 2007/0057211 A1 | 3/2007 | Bahlman et al. | |
| 2008/0106628 A1 | 5/2008 | Cok et al. | |
| 2009/0141116 A1* | 6/2009 | Kanade | H04N 7/144 348/14.01 |
| 2012/0026325 A1 | 2/2012 | Bunker et al. | |
| 2012/0032875 A1 | 2/2012 | Sprowl et al. | |
| 2012/0169669 A1 | 7/2012 | Lee et al. | |
| 2012/0229610 A1 | 9/2012 | Fukushima et al. | |
| 2012/0249724 A1* | 10/2012 | Morrison | G06F 3/013 348/14.16 |
| 2013/0016256 A1 | 1/2013 | Yahagi et al. | |
| 2013/0033593 A1 | 2/2013 | Chinnock et al. | |
| 2014/0055978 A1 | 2/2014 | Gantz et al. | |
| 2015/0163400 A1 | 6/2015 | Geiss et al. | |
| 2015/0253931 A1 | 9/2015 | Wyrwas et al. | |
| 2015/0304627 A1 | 10/2015 | Sheikh Faridul et al. | |
| 2015/0310253 A1 | 10/2015 | Agrawal et al. | |
| 2016/0041384 A1 | 2/2016 | Robbins et al. | |
| 2016/0116944 A1 | 4/2016 | Lee et al. | |
| 2016/0117860 A1 | 4/2016 | Fei et al. | |
| 2016/0180591 A1 | 6/2016 | Shiu et al. | |
| 2016/0309134 A1 | 10/2016 | Venkataraman et al. | |
| 2016/0335778 A1 | 11/2016 | Smits | |
| 2017/0038597 A1 | 2/2017 | Li et al. | |
| 2017/0069097 A1 | 3/2017 | Molgaard et al. | |
| 2017/0094141 A1 | 3/2017 | Hicks | |
| 2017/0131766 A1 | 5/2017 | He et al. | |
| 2017/0154570 A1 | 6/2017 | Suh et al. | |
| 2017/0192499 A1* | 7/2017 | Trail | G06F 3/011 |
| 2017/0220838 A1 | 8/2017 | He et al. | |
| 2017/0220844 A1 | 8/2017 | Jones et al. | |
| 2017/0243373 A1 | 8/2017 | Bevensee et al. | |
| 2017/0272731 A1 | 9/2017 | Kashyap | |
| 2018/0068430 A1 | 3/2018 | Sang et al. | |
| 2018/0139431 A1 | 5/2018 | Simek et al. | |
| 2018/0157908 A1 | 6/2018 | Sahlsten et al. | |
| 2018/0197482 A1* | 7/2018 | Choi | G09G 3/3266 |
| 2018/0198980 A1 | 7/2018 | Takagi et al. | |
| 2018/0300589 A1* | 10/2018 | Levinshtein | G06K 9/00268 |
| 2018/0332205 A1 | 11/2018 | Hawthrone et al. | |
| 2018/0338049 A1 | 11/2018 | Wachi | |
| 2019/0132570 A1 | 5/2019 | Chen et al. | |
| 2019/0158713 A1* | 5/2019 | Mcmillan | G02B 27/0018 |
| 2019/0164522 A1 | 5/2019 | Bonnier et al. | |
| 2019/0294108 A1 | 9/2019 | Ozcan et al. | |
| 2019/0318677 A1* | 10/2019 | Lu | G06F 3/012 |
| 2019/0333233 A1 | 10/2019 | Hu et al. | |
| 2020/0099920 A1 | 3/2020 | Khamis et al. | |
| 2020/0195764 A1* | 6/2020 | Xu | H04N 5/2258 |
| 2020/0265206 A1 | 8/2020 | Chung et al. | |
| 2020/0389575 A1 | 12/2020 | Gove | |

FOREIGN PATENT DOCUMENTS

| | | |
|---|---|---|
| WO | 2017052766 A1 | 3/2017 |
| WO | 2017161520 A1 | 9/2017 |
| WO | 2018/049201 A1 | 3/2018 |
| WO | 2019045750 A1 | 3/2019 |

OTHER PUBLICATIONS

Ivanov Bonev et al., "Light Source for Camera," U.S. Appl. No. 16/544,488, filed Aug. 19, 2019.

International Search Report and Written Opinion dated Sep. 3, 2020, issued in International Application No. PCT/US2020/034301, filed May 22, 2020, 11 pages.

International Search Report and Written Opinion dated Sep. 9, 2020, issued in International Application No. PCT/US2020/035761, filed Jun. 2, 2020, 12 pages.

* cited by examiner

UNDER-DISPLAY IMAGE SENSOR FOR EYE TRACKING

TECHNICAL FIELD

The present embodiments relate generally to systems and methods for imaging, and specifically to under-display image sensors for eye tracking.

BACKGROUND OF RELATED ART

Many electronic devices such as smartphones, tablets, laptops, head-mounted displays (HMDs), and other computing devices include components for eye tracking in an eye tracking unit. The eye tracking unit may include cameras, mirrors, and lenses. Often, the eye tracking unit is disposed adjacent to the display, which may obstruct a user's view of the display area and add bulk to the electronic device. Further, where an eye tracking camera is disposed peripheral to a user's eyes, additional components (e.g., mirrors and lenses) may be required to capture a wide angle view of the user's eyes. Such additional components may introduce geometric distortions in the images captured of the user's eyes, further complicating the tracking of eye position and movement.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

A method for eye tracking is disclosed. The method may include receiving a first image captured by a first camera based at least in part on reflections of light emitted by a light source. The reflections may be partially occluded by an electronic display disposed in front of the first camera. The method may further include detecting an eye of a user in the partially occluded first image and determining a position or orientation of the eye relative to the electronic display.

A device is disclosed. The device may include an electronic display, a first camera disposed behind the electronic display, and an eye tracking module. The first camera may be configured to detect reflections of light emitted by a light source and to capture a first image based at least in part on the reflections, wherein the reflections are partially occluded by the electronic display. The eye tracking module may be configured to detect an eye of a user in the partially occluded first image, and to determine a position or orientation of the eye relative to the electronic display.

A processing system is disclosed. The processing system may include a processor and a memory storing instructions that, when executed by the processor, cause the processing system to receive an image captured by a camera based at least in part on reflections of light emitted by a light source, wherein the reflections are partially occluded by an electronic display disposed in front of the camera. The instructions, when executed by the processor, may further cause the processing system to detect an eye of a user in the partially occluded image and determine a position or orientation of the eye relative to the electronic display.

BRIEF DESCRIPTION OF THE DRAWINGS

The present embodiments are illustrated by way of example and are not intended to be limited by the figures of the accompanying drawings.

DETAILED DESCRIPTION

Figure 1A:
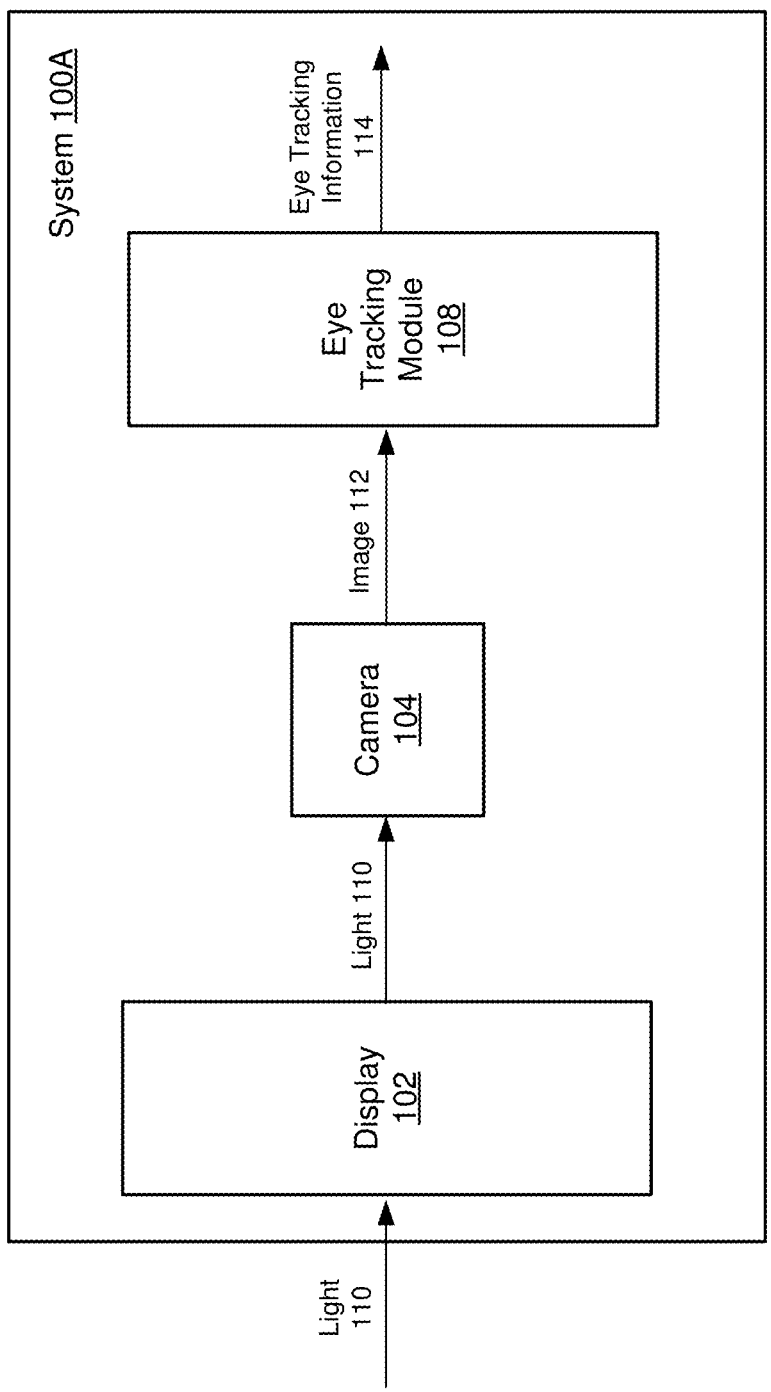
FIG. 1A shows a block diagram of an example electronic system, in accordance with some embodiments.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the aspects of the disclosure. However, it will be apparent to one skilled in the art that these specific details may not be required to practice the example embodiments. In other instances, well-known circuits and devices are shown in block diagram form to avoid obscuring the present disclosure. Some portions of the detailed descriptions which follow are presented in terms of procedures, logic blocks, processing and other symbolic representations of operations on data bits within a computer memory. The interconnection between circuit elements or software (SW) blocks may be shown as buses or as single signal lines. Each of the buses may alternatively be a single signal line, and each of the single signal lines may alternatively be buses, and a single line or bus may represent any one or more of a myriad of physical or logical mechanisms for communication between components.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging,"

"monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The techniques described herein may be implemented in hardware, SW, firmware, or any combination thereof, unless specifically described as being implemented in a specific manner. Any features described as modules or components may also be implemented together in an integrated logic device or separately as discrete but interoperable logic devices. If implemented in SW, the techniques may be realized at least in part by a non-transitory computer-readable storage medium comprising instructions that, when executed, performs one or more of the methods described above. The non-transitory computer-readable storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits and instructions described in connection with the embodiments disclosed herein may be executed by one or more processors. The term "processor," as used herein may refer to any general-purpose processor, conventional processor, controller, microcontroller, and/or state machine capable of executing scripts or instructions of one or more SW programs stored in memory.

Aspects of the disclosure provide a system, device, and method for eye tracking that can be implemented behind a display of an electronic system or device. The eye tracking techniques of the present embodiments may be used to assess a user's visual attention. In some embodiments, an electronic system may include a display, a camera, and an eye tracking module. The display may comprise a porous display such as, for example, an organic light-emitting diode (OLED) display or a micro light-emitting diode (micro-LED) display. The camera may be disposed behind the display such that, when a user views the display, the camera may reside in or near the user's point of gaze and the camera may capture an image of the user's eye(s). The eye tracking module may be configured to detect the user's eye(s) in the captured image, and to determine information such as the eye's (or eyes') position, orientation, movement, gaze direction (i.e. line of sight), and point of gaze (e.g., display pixel and/or display subpixel being viewed by the user), for eye tracking.

By disposing the camera under the display, the camera's field-of-view (FOV) may be partially occluded by display pixels and/or display subpixels in the display. However, aspects of the present disclosure recognize that the display may contain "holes" or empty space between the display pixels and/or display subpixels for at least some light to pass through. In some embodiments, a neural network model (e.g., a convolutional neural network (CNN)) or other algorithm may be used to filter out noise or interference, such as a "screen door effect," from the occlusions by the display pixels and/or display subpixels. The resulting image may be used for eye tracking or other applications.

Disposing the camera under the display, as opposed to above or to the side of the display, may provide a number of advantages. For example, when a user views the display, the camera may be positioned in or near the user's point of gaze such that the camera may have a full view of the user's eye area. The camera may then capture an image of the user's eye which may be used to more precisely determine the eye's position and/or orientation, each relative to the display. In turn, this may improve the accuracy of eye tracking and help simplify the calculations needed to perform eye tracking. For example, eye tracking calculations may not need to account for geometric distortions in images captured by a camera that is positioned to the side of a display, with a wide angle between the camera's view of the user's eye and the user's gaze direction to the display. Further, by simplifying the calculations, the electronic system's computational efficiency, and in turn, its power efficiency, may improve. In addition, the electronic system may require less packaging relative to bulkier systems where an eye tracking camera is disposed above the display.

FIG. 1A shows a block diagram of an example electronic system 100A (also referred to as the "system 100A"), in accordance with some embodiments. The system 100A includes a display 102, a camera 104, and an eye tracking module 108.

The display 102 is configured to display visual information to a user, to receive user input, and/or to transmit light from an object or scene being imaged to the camera 104. In some embodiments, the display 102 may be a porous display, such as an OLED display or a micro-LED display, which contains holes or gaps between display pixels and/or display subpixels. In some embodiments, the display 102 may include a transparent layer configured to transmit light from the object or scene being imaged to the camera 104.

The camera 104 is configured to capture an image of an object or scene in front of the display 102. The camera 104 may comprise an array of active pixel sensors or photosensors (e.g., photodiodes, complementary metal oxide semiconductor (CMOS) image sensor arrays, charge coupled device (CCD) arrays, and/or any other sensors capable of detecting wavelengths of light in the visible spectrum, the IR spectrum (e.g., near infrared (NIR) or short wave infrared (SWIR)), or the UV spectrum). In some embodiments, the camera 104 may be configured to detect light in the IR spectrum (e.g. NIR or SWIR light) and/or visible light (e.g., red light). Further, the camera 104 may be configured to perform wide-range imaging, where an object or scene is imaged either close up or far away. In addition, the camera 104 may be configured to capture up to or more than 2000 images per second to support eye tracking. Although one camera is depicted in the example of FIG. 1A, other implementations of the system 100A may include two or more cameras.

As shown in FIG. 1A, the camera 104 is disposed behind (or proximate to) the display 102. As a result, when a user views the display 102, the camera 104 may be positioned within the user's line of sight, or in or near the user's point of gaze. Thus, the camera may have a full view of the user's eye area, which may improve the accuracy of eye tracking and help simplify the calculations needed to perform eye tracking.

The eye tracking module 108 may be configured to detect at least one eye of a user in an image captured by the camera 104. The eye tracking module 108 may also be configured to determine information such as the eye's position, orientation, movement, gaze direction, and point of gaze, for eye tracking.

During operation, the display 102 may receive light 110 from objects in front of the camera, such as a user's eye. Some of the light 110 may be occluded by display pixels and/or display subpixels in the display 102, while the remainder of the light 110 passes through the holes or gaps between the display pixels and/or display subpixels. The light 110 that passes through the holes may be detected by the camera 104 and captured as an image 112. The image 112 may then be transferred to the eye tracking module 108, which may analyze the image 112 to detect at least one eye of the user. The eye tracking module 108 may also determine and output the eye tracking information 114, which may include, for example, the eye's position, orientation, movement, gaze direction, and point of gaze, each of which may be relative to the display 102. The eye tracking module 108 may also receive subsequent images (e.g., still images and/or video) to track the eye's movement over time.

Figure 1B:
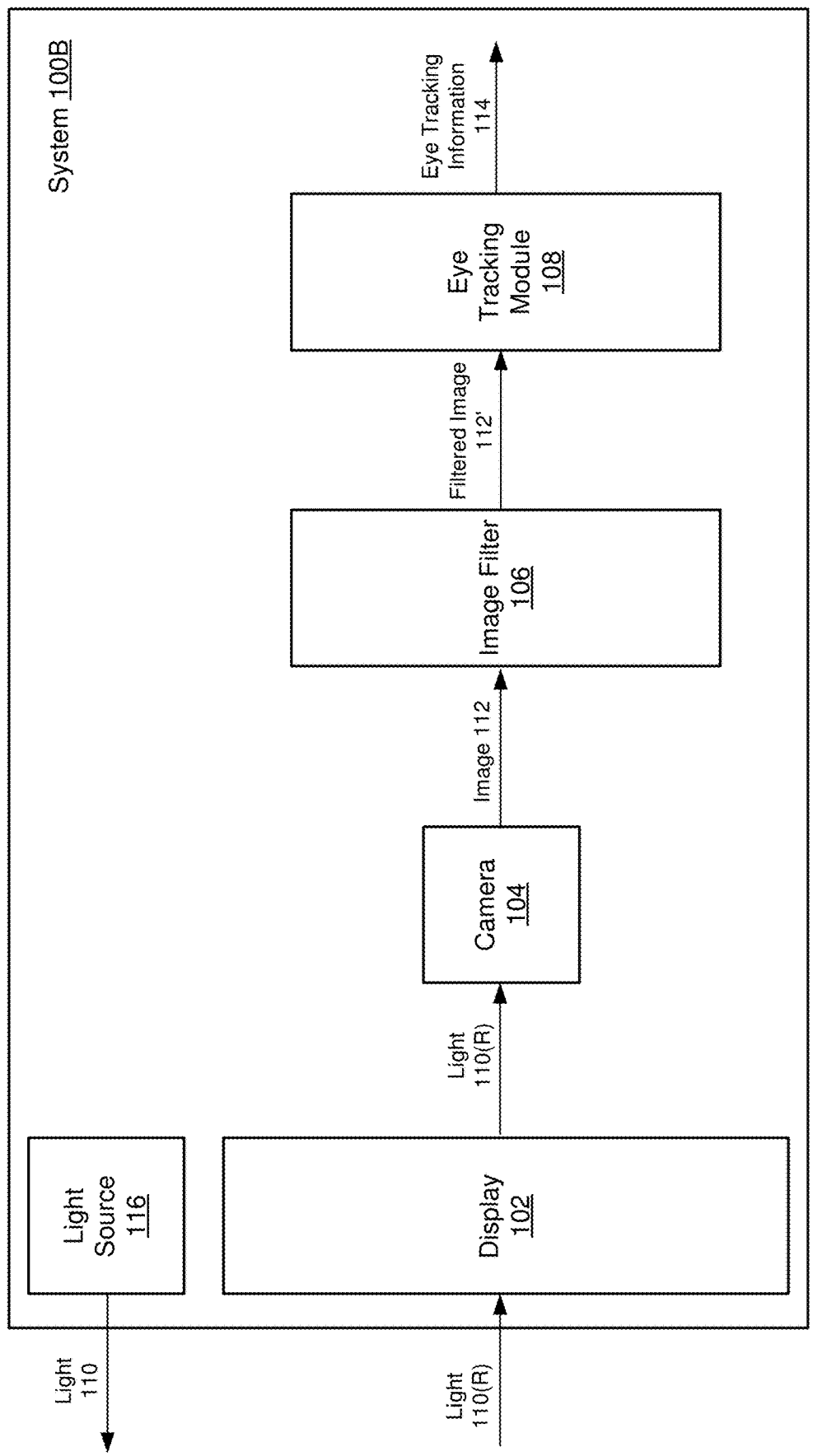
FIG. 1B shows a block diagram of an example electronic system, in accordance with some embodiments.

FIG. 1B shows a block diagram of an example electronic system 100B (also referred to as the "system 100B"), in accordance with some embodiments. The system 100B may be an embodiment of the system 100A described with reference to FIG. 1A. As shown, the system 100B includes the display 102, a light source 116, the camera 104, an image filter 106, and the eye tracking module 108.

The light source 116 is configured to illuminate an object or scene being imaged. The light source 116 may comprise a light-emitting diode (LED) or other light source capable of emitting wavelengths of light in the IR spectrum (including but not limited to NIR or SWIR) and/or the visible spectrum. In some embodiments, the system 100B may include more than one light source 116. Further, the light source 116 may be disposed in a position different from that shown in FIG. 1B, and the light source 116 may be disposed under the display 102, in the same plane as the display 102, in the bezel of the display 102, or in any combination thereof.

The image filter 106 is configured to remove noise, blurriness, haziness, or other types of interference in an image captured by the camera 104. The noise or interference may be caused by the display pixels and/or display subpixels in the display 102, which may block some light from passing through the display 102 to the camera 104. The image filter 106 may be further configured to remove, in full or in part, features in an image that hinder eye tracking. For example, the image filter 106 may be configured to remove eye lashes or eye lids from an image if the eye lashes or eye lids obscure the user's pupil, iris, sclera, or other feature used for eye tracking.

During operation, the light source 116 may emit light 110 to illuminate a scene in front of the camera 104. In some embodiments, the light 110 may be modulated or encoded. Objects in the scene, such as a user's eye, may reflect at least a portion of the light 110 back towards the display 102, for example, as reflected light 110(R). Some of the reflected light 110(R) may be occluded by display pixels and/or display subpixels in the display 102, while the remainder of the reflected light 110(R) passes through holes or gaps between the display pixels and/or display subpixels. The reflected light 110(R) that passes through the holes may be detected by the camera 104 and captured as an image 112. The image 112 may then be transferred to the image filter 106. The image filter 106 may remove noise or interference in the image 112 and produce the filtered image 112'. The eye tracking module 108 may then receive the filtered image 112' and analyze the image to detect at least one eye of the user. As described with reference to FIG. 1A, the eye tracking module 108 may also determine and output the eye tracking information 114.

Figure 1C:
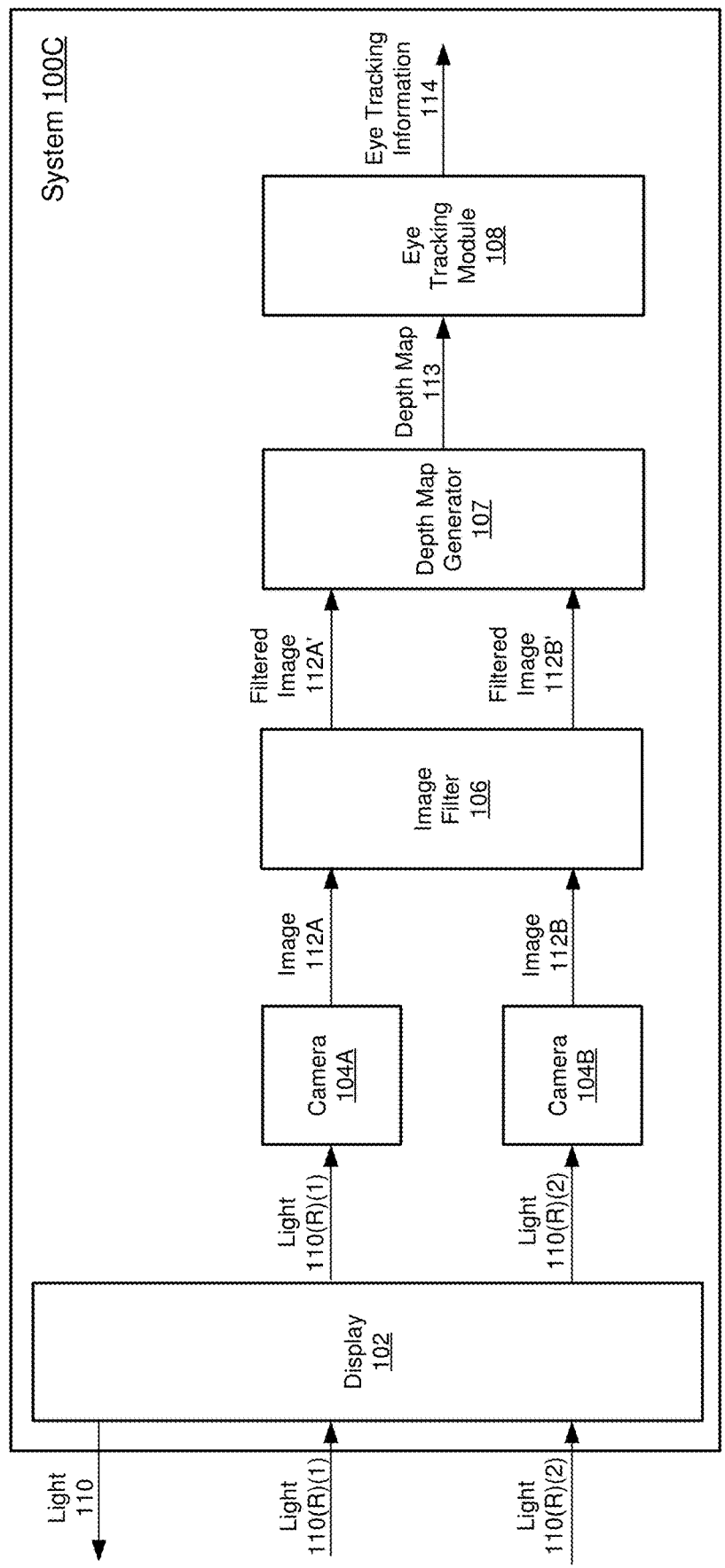
FIG. 1C shows a block diagram of an example electronic system, in accordance with some embodiments.

FIG. 1C shows a block diagram of an example electronic system 100C (also referred to as the "system 100C"), in accordance with some embodiments. The system 100C may be an embodiment of the systems 100A and/or 100B, described with reference to FIGS. 1A and 1B, respectively. As shown, the system 100C includes the display 102, cameras 104A and 104B, the image filter 106, a depth map generator 107, and the eye tracking module 108.

As shown in FIG. 1C, the display 102 may be configured to emit light. More specifically, display pixel(s) and/or display subpixel(s) in the display 102 may be configured to emit the light 110, which may comprise wavelengths of light in the IR spectrum (including but not limited to NIR or SWIR) and/or the visible spectrum.

FIG. 1C also shows two cameras—the cameras 104A and 104B—disposed behind the display 102. Each of the cameras 104A and 104B may be configured to capture an image of an object or scene in front of the display 102 and may be an embodiment of the camera 104 of FIGS. 1A and 1B.

The depth map generator 107 may be configured to determine depth information about an object(s) or scene imaged by the cameras 104A and 104B. More specifically, the depth map generator 107 may be configured to receive images captured by the cameras 104A and 104B, and the depth map generator 107 may use stereopsis to combine the images and extract depth information from the images. The depth map generator 107 may output the depth information as a depth map 113, which may then be transferred to the eye tracking module 108.

During operation, the display 102 may emit light 110 to illuminate a scene in front of the cameras 104A and 104B. Objects in the scene (e.g., the user's eye(s)) may reflect at least a portion of the light 110 back towards the display 102, for example, as reflected light 110(R)(1) and 110(R)(2). Some of the reflected light 110(R)(1) and 110(R)(2) may be occluded by display pixels and/or display subpixels in the display 102, while the remainder of the reflected light 110(R)(1) and 110(R)(2) passes through the holes or gaps between the display pixels and/or display subpixels. The reflected light 110(R)(1) and 110(R)(2) that passes through the holes may be detected by the cameras 104A and 104B, respectively. The camera 104A may capture the reflected light 110(R)(1) that is detected as image 112A, and the camera 104B may capture the reflected light 110(R)(2) that is detected as image 112B. The images 112A and 112B may then be transferred to the image filter 106. The image filter 106 may remove noise or interference in the images 112A and 112B, and then output the respective filtered images 112A' and 112B'.

The depth map generator 107 may receive the filtered images 112A' and 112B' and, in some embodiments, use stereopsis to combine the images and extract depth information. The depth information may be output as the depth map 113. The eye tracking module 108 may then receive the depth map 113 and analyze the depth information to detect at least one eye of the user. The eye tracking module 108 may also determine and output the eye tracking information 114, which may include, for example, the eye's position, orientation, movement, gaze direction and point of gaze. The eye tracking module 108 may also receive subsequent depth maps (e.g., still and/or animated depth maps) to track the eye's movement over time.

Figure 1D:
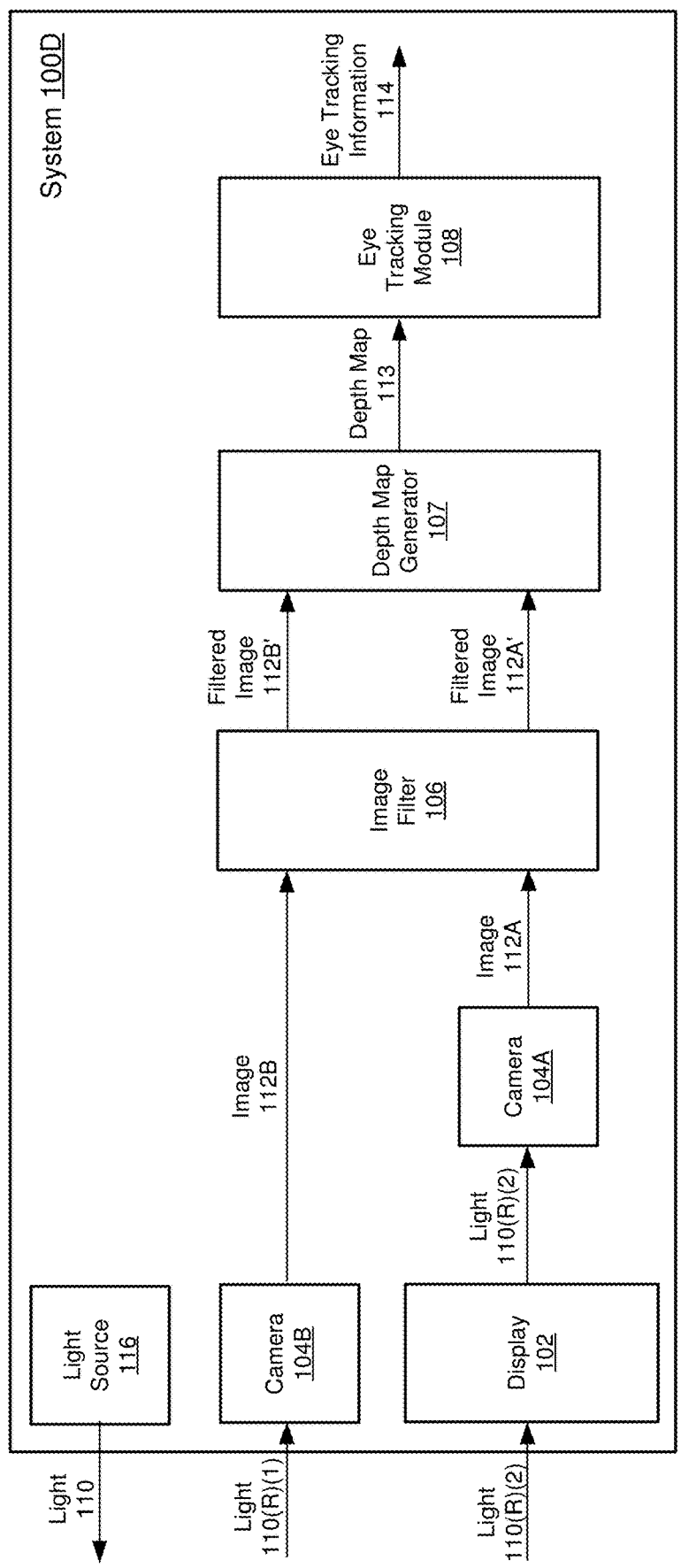
FIG. 1D shows a block diagram of an example electronic system, in accordance with some embodiments.

FIG. 1D shows a block diagram of an example electronic system 100D (also referred to as the "system 100D"), in accordance with some embodiments. The system 100D may be an embodiment of the systems 100A-100C described with reference to FIGS. 1A-1C. The cameras 104A and 104B may be embodiments of the cameras 104A and 104B of FIG. 1C. As shown in FIG. 1D, the camera 104B is disposed to a side (or proximate to) the display 102, instead of behind the display 102 as shown in FIG. 1C. During eye tracking, the system 100D may operate in a manner similar to that of systems 100B and 100C.

Figure 1E:
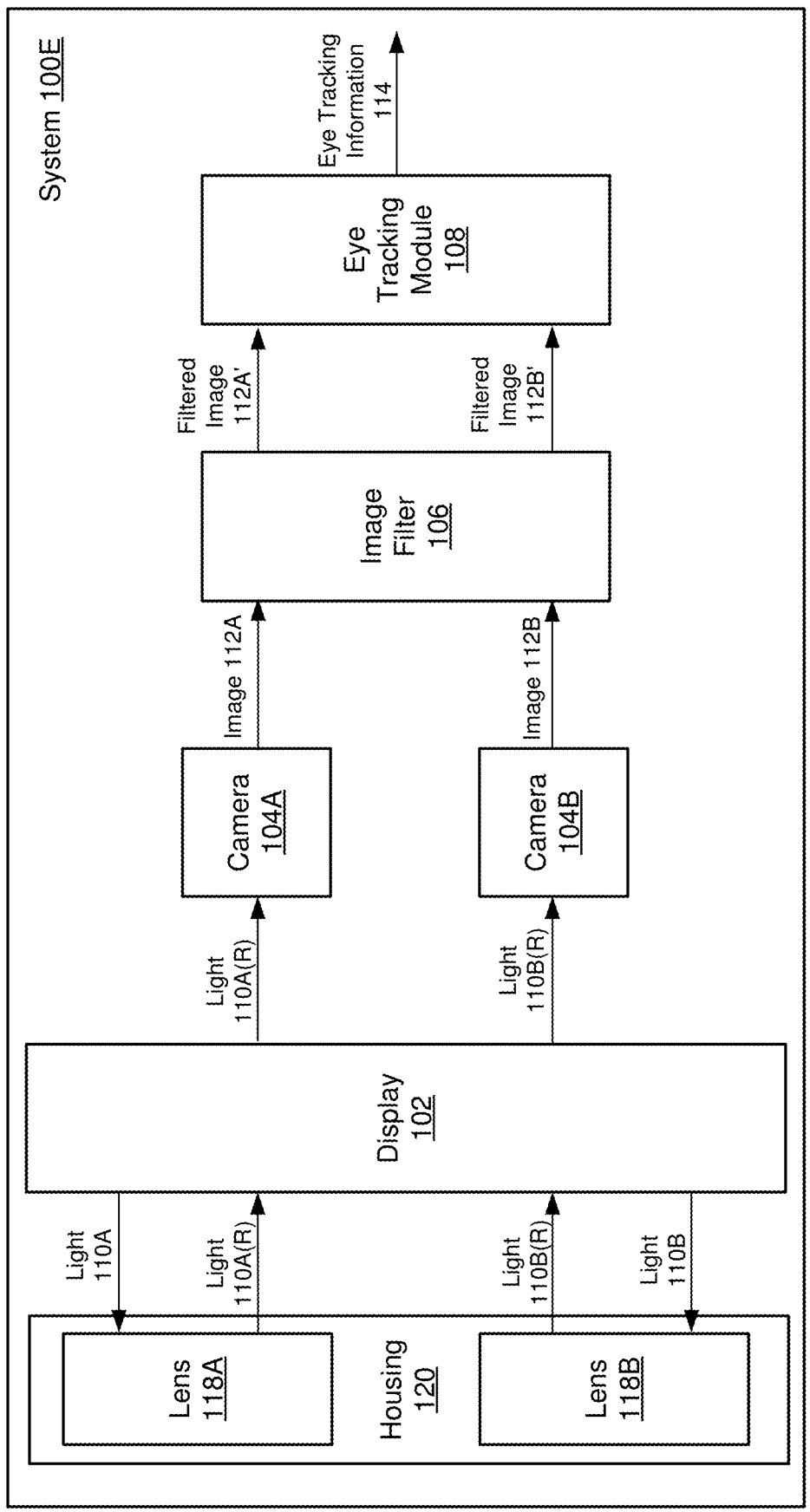
FIG. 1E shows a block diagram of an example electronic system, in accordance with some embodiments.

FIG. 1E shows a block diagram of an example electronic system 100E (also referred to as the "system 100E"), in accordance with some embodiments. The system 100E may be an embodiment of the systems 100A-100D described with reference to FIGS. 1A-1D. As shown in FIG. 1E, the system 100E includes housing 120 and lenses 118A and 118B, among other components. In some embodiments, the system 100E may be a head-mounted display (HMD), which is an electronic display worn on or attached to a user's head.

The housing 120 is a structure configured to couple the lenses 118A and 118B to the display 102. In some embodiments, the housing 120 may comprise goggles, glasses, a helmet, or a similar device configured to be worn on or attached to the user's head. Each of the lenses 118A and 118B may be an optical lens or assembly lenses configured to focus light emitted by display pixels and/or display subpixels in the display 102, or other light sources, to the user's eyes. Each of the lenses 118A and 118B may be configured to pass wavelengths of light in the IR spectrum (e.g., NIR and/or SWIR) and/or the visible spectrum.

To operate the system 100E, a user may place the system 100E on the user's head such that the user's eyes are substantially aligned with the lenses 118A and 118B and the user can view the display 102. To begin eye tracking, display pixels and/or display subpixels in the display 102 (or other light sources) emit light 110A and 110B, in some cases by displaying an image. The light 110A and 110B passes through the lenses 118A and 118B, respectively, to illuminate the user's eyes. The user's eyes may reflect at least a portion of the light 110A and 110B back towards the display 102, for example, as reflected light 110A(R) and 110B(R), respectively. Some of the reflected light 110A(R) and 110B(R) may be occluded by display pixels and/or display subpixels in the display 102, while the remainder of the reflected light 110A(R) and 110B(R) passes through the holes or gaps between the display pixels and/or display subpixels, and is detected by the cameras 104A and 104B, respectively. The camera 104A may capture the reflected light 110A(R) that is detected as the image 112A, and the camera 104B may capture the reflected light 110B(R) that is detected as the image 112B. The images 112A and 112B may then be transferred to the image filter 106, which may remove noise, blurriness, haziness, or other types of interference in the images 112A and 112B, and then output the respective filtered images 112A' and 112B'. The eye tracking module 108 may then receive the filtered images 112A' and 112B' and analyze the images to detect each eye of the user. The eye tracking module 108 may also determine and output the eye tracking information 114 for one or both of the user's eyes.

Figure 2A:
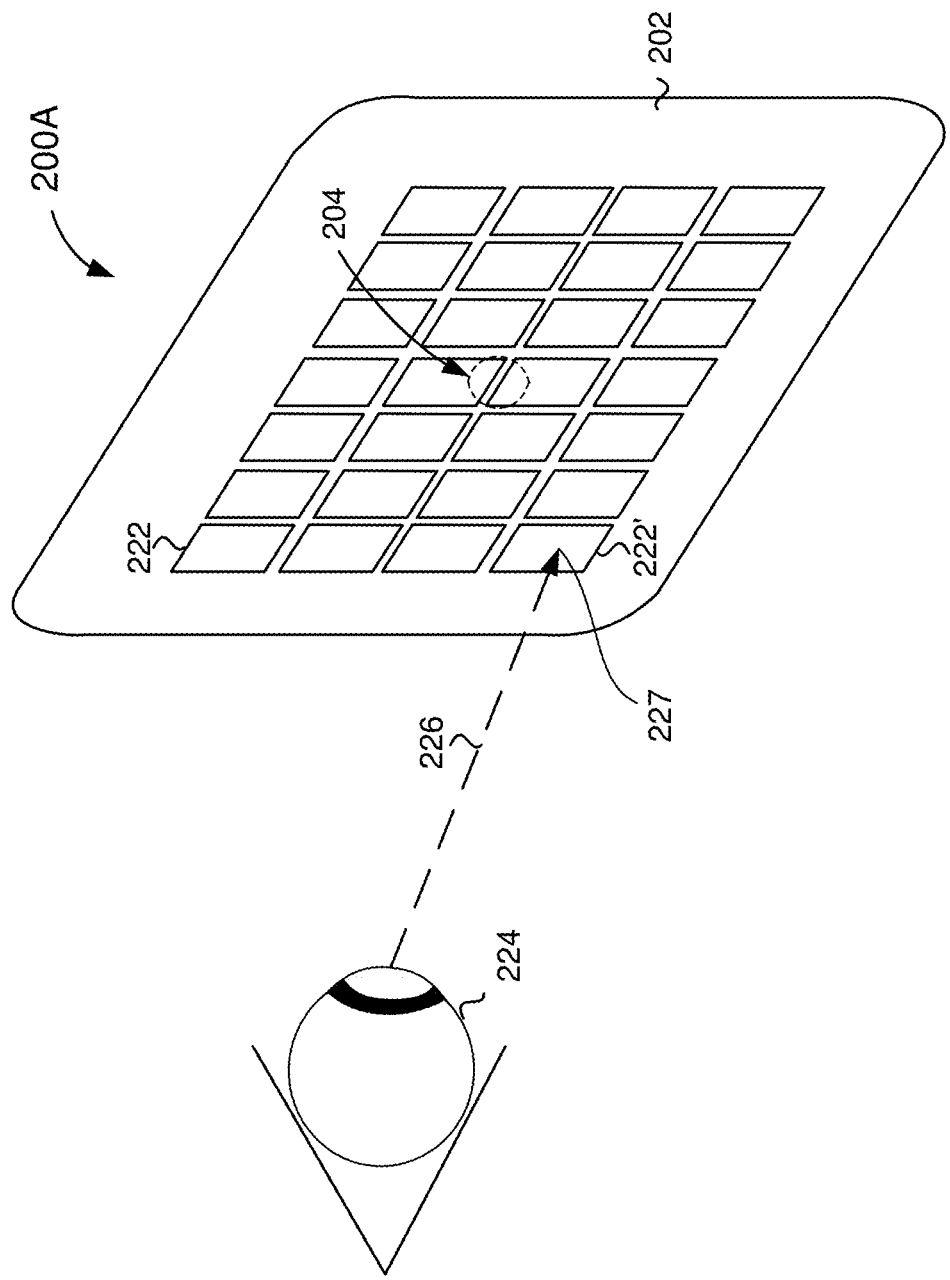
FIGS. 2A-2E each show an application of an example electronic system, in accordance with some embodiments.

FIG. 2A shows an application of an example electronic system 200A, in accordance with some embodiments. The electronic system 200A may be an embodiment of the electronic systems 100A and/or 100B in FIGS. 1A and 1B. As shown in FIG. 2A, the electronic system 200A includes a display 202, display pixels and/or display subpixels 222, and a camera 204. The display pixels and/or display subpixels 222 may be disposed in the display 202, and the camera 204 (shown in dashed lines) may be disposed behind the display 202. The display 202 may be an embodiment of the display 102 of FIGS. 1A-1E. Further, the camera 204 may be an embodiment of the cameras 104, 104A, and/or 104B of FIGS. 1A-1E.

As shown in FIG. 2A, a user's eye 224 is viewing the display pixel and/or display subpixel 222' of the display 202. Thus, the user's gaze direction 226 (or line of sight) is denoted by a dashed arrow and is directed toward a point of gaze 227.

During eye tracking, display pixel(s) and/or display subpixel(s) 222 (or another light source) emit light (e.g., IR light and/or red light) to illuminate the user's eye 224. The eye 224 may reflect at least a portion of the light back towards the display 202 and the camera 204. Some of the reflected light may be occluded by the display pixels and/or display subpixels 222, while the remainder of the light may pass through holes or gaps between the display pixels and/or display subpixels 222 and be detected by the camera 204. The camera 204 may capture the detected light as an image, and the image may be transferred to an image filter. The image filter may remove noise, distortion, or interference in the image, and produce a filtered image. An eye tracking module may then receive the filtered image and analyze the filtered image to detect the eye 224. The image filter and the eye tracking module may be embodiments of the image filter 106 and the eye tracking module 108 of FIGS. 1A-1E and are not shown here for simplicity. Thus, the eye tracking module may determine and output eye tracking information or parameters, such as, for example, the eye's position, orientation, movement, gaze direction 226, point of gaze 227 (i.e., the display pixel and/or display subpixel 222' and/or the location of the display pixel and/or display subpixel 222'), the eye's geometry, pupil size and/or dilation, and/or the distance between the user and the electronic system 200A or point of gaze 227. The eye tracking module may also receive subsequent images (e.g., still images and/or video) to track the eye's movement over time.

To perform eye tracking, any suitable method may be used. For example, the eye tracking module may use one or more reflections of light from an eye to determine the eye's position and/or orientation. The eye tracking module may analyze light reflected from a user's cornea and the back of the lens in the user's eye to perform eye tracking. As another example, the eye tracking module may analyze light reflected from the user's cornea, and the location of the center of the user's pupil, to perform eye tracking. In yet another example, the eye tracking module may be configured to detect features inside of the eye, such as retinal blood vessels, to perform eye tracking. Further, the eye tracking module may use the center and/or contour of the user's pupil or iris; the center of the user's eyeball; the corner(s) of the user's eye; the user's sclera and/or eye lid; the shape and/or color(s) of the user's eye; or even other facial features of the user to perform eye tracking. The eye tracking module may also account for movement of the user's head, the user's head pose or orientation, and/or movement of the electronic system 200A during eye tracking.

The position of the eye may refer to a location on or inside the eye that corresponds to, is aligned with, or may be used to determine, the gaze direction 226 and/or the point of gaze 227. The orientation of the eye may refer to a location of the eye that is relative to, for example, a feature of the user's face or head, or the display 202. Further, the orientation may be used to determine, or may be aligned with, the gaze direction 226 and/or the point of gaze 227 (or the display pixel and/or display subpixel 222'). The gaze direction 226 may comprise a vector or line of sight directed to, or aligned with, the point of gaze 227 or a point of interest, such as the display pixel and/or display subpixel 222'. In some aspects, the user's eye position may be converted (or mapped to) the position of the point of gaze 227. Further, to perform eye tracking, the eye tracking module may use 2D and/or 3D coordinates (e.g., along X, Y, and Z axes), Euler angles or other angles, quaternions, or other systems or parameters to characterize the position, orientation, and/or movement of the eye, the user's gaze direction 226, and/or point of gaze 227.

In some embodiments, prior to or during eye tracking, the eye tracking module may perform a calibration procedure to ensure that eye tracking is performed with increased precision. The calibration procedure may include having the user view one or more points displayed on the display 202. The one or more points may be static or move in a random or predetermined trajectory when displayed on the display 202. The calibration procedure may further include determining and recording the position, orientation, and/or movement of the user's eye(s) when the points are displayed.

The eye tracking information determined by the eye tracking module may be used for many different applications. For example, when a user views the display of an electronic system, eye tracking information may help determine what a user is looking at on the display, when the user places attention on certain visual elements on the display, how long a user gazes at a particular point of gaze, the order in which visual elements are fixated upon, and if the user's gaze returns to a visual element that the user looked at before. Further, the eye tracking information may be used to gather usage analytics, to enhance a user's experience with visual information presented on the display 202, and to perform foveated rendering.

The eye tracking information may also permit a user to control an electronic system. For example, when a user moves his or her eyes, blinks, or makes a gesture using his or her eyes, the user may be able to move a cursor, navigate menus, and/or launch and interact with various applications. In addition, the eye tracking information may be used to alleviate symptoms related to motion sickness, doom sickness, cybersickness and/or simulator sickness, which a user may sometimes experience when viewing an electronic system such as an HMD. For example, the eye tracking information may be used to modify visual information (e.g., the FOV or image resolution), the sensitivity or responsiveness of objects on the display which the user may control, the frame rate of the display, the refresh rate of the display, and/or light emitted by the display or other light sources. Moreover, the eye tracking information may be used in applications involving virtual reality, augmented reality and/or mixed reality, and the eye tracking information may be used in any device including an electronic display such a mobile phone, tablet, phablet, laptop, automobiles (e.g., consoles), or other consumer or commercial goods.

Figure 2B:
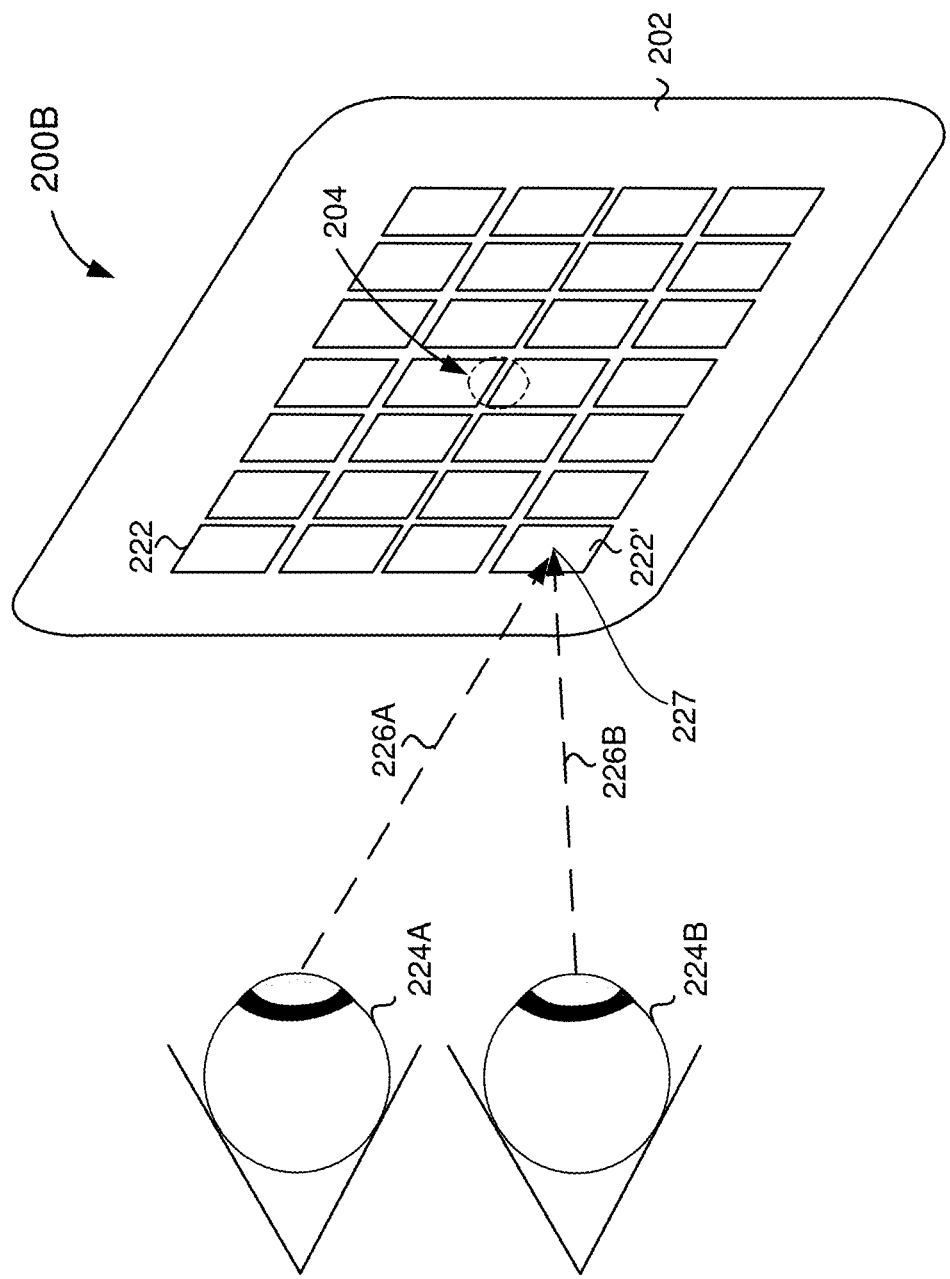

FIG. 2B shows an application of an example electronic system 200B, in accordance with some embodiments. The electronic system 200B may be an embodiment of the electronic systems 100A, 100B, and/or 200A of FIGS. 1A, 1B and 2A. As shown in FIG. 2B, the electronic system 200B includes the display 202, the display pixels and/or display subpixels 222, and the camera 204. Unlike FIG. 2A, both of a user's eyes 224A and 224B are directed at the display pixel and/or display subpixel 222' in FIG. 2B. In other words, the user's eye 224A is directed at the point of gaze 227 via gaze direction 226A, and the user's eye 224B is directed at the point of gaze 227 via gaze direction 226B. In some embodiments, depending on the distance between the user's eyes 224A and 224B and the camera 204, one or both of the user's eyes 224A and 224B may reside within the FOV of the camera 204 and be detected by the camera 204 for eye tracking. Further, the eye tracking module may determine eye tracking information for one or both of the user's eyes 224A and 224B.

In some embodiments, the eye tracking module may use eye tracking information for one eye to validate or verify the eye tracking information for another the eye. The eye tracking information may include, for example, the position, orientation, movement, gaze direction and/or point of gaze for a particular eye. For example, the eye tracking module may use the gaze direction 226A or the orientation of the user's first eye 224A to identify (or determine) the display pixel and/or display subpixel 222' associated with the point of gaze 227. In other words, the eye tracking module may identify the display pixel or subpixel 222' that is aligned with the orientation of the user's first eye 224A. The eye tracking module may further verify or confirm that the user's first eye 224A is aligned with the display pixel and/or display subpixel 222' associated with the point of gaze 227 based on the position or orientation of the user's second eye 224B. For example, the eye tracking module may verify the alignment of the first eye 224A by determining that the orientation of the second eye 224B is also aligned with the display pixel and/or display subpixel 222' associated with the point of gaze 227.

Figure 2C:
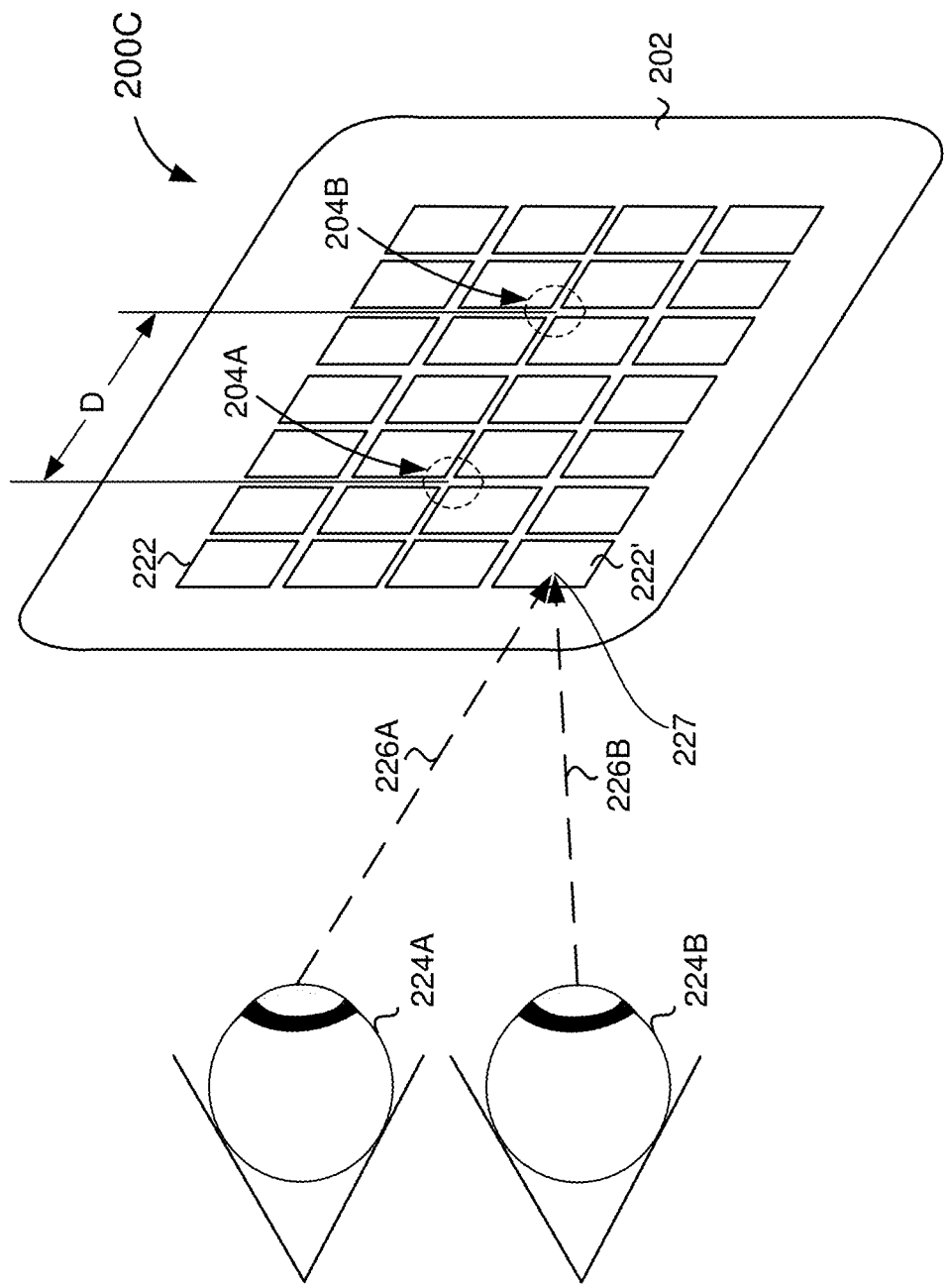

FIG. 2C shows an application of an example electronic system 200C, in accordance with some embodiments. The electronic system 200C may be an embodiment of any or a combination of the electronic systems 100A-200B in FIGS. 1A-2B. As shown in FIG. 2C, the electronic system 200C includes the display 202, the display pixels and/or display subpixels 222, and cameras 204A and 204B. The cameras 204A and 204B may be embodiments of the camera 204 of FIGS. 2A-2B. Further, the user's eye 224A is directed at the point of gaze 227 via gaze direction 226A, and the user's eye 224B is directed at the point of gaze 227 via gaze direction 226B. In some embodiments, the distance D between the cameras 204A and 204B may vary from that shown in FIG. 2C. During eye tracking, the electronic system 200C may operate in a manner similar to that of electronic systems 100C-100E.

For one or both of the eyes as described with reference to FIG. 2B, an eye tracking module may determine and output eye tracking information such as, for example, the eyes' positions, orientations, movements, gaze directions and points of gaze. The eye tracking module may also receive subsequent depth information (e.g., still and/or animated depth maps) to track the eyes' movements over time. Further, in some embodiments, the eye tracking module may determine the presence of vergence, which refers to the simultaneous movement of a user's pupils toward or away from one another during focusing.

Figure 2D:
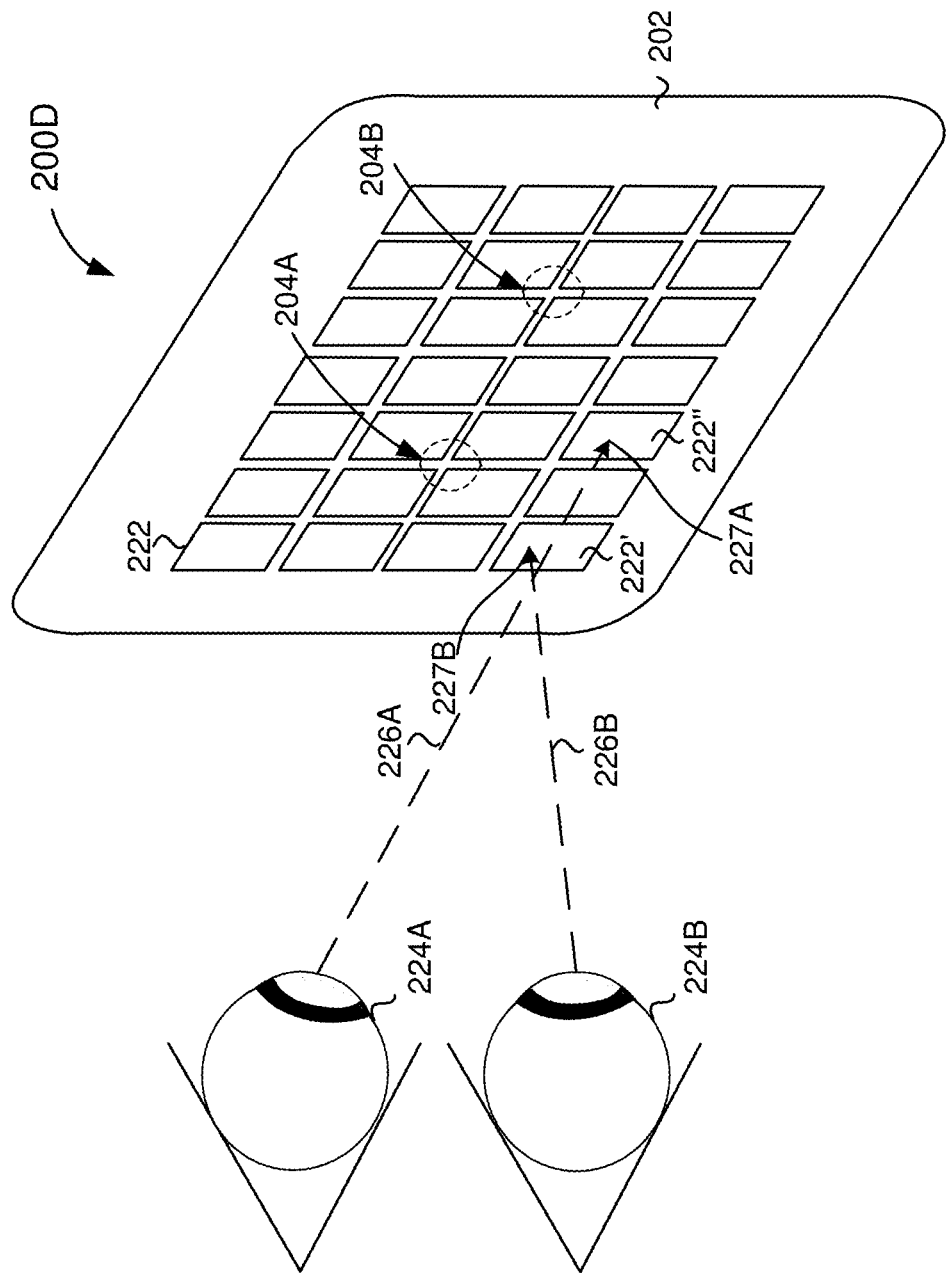

FIG. 2D shows an application of an example electronic system 200D, in accordance with some embodiments. The electronic system 200D may be an embodiment of any, or a combination of, the electronic systems 100C-100E of FIGS. 1C-1E and electronic system 200C of FIG. 2C. As shown in FIG. 2D, the electronic system 200D includes the display 202, the display pixels and/or display subpixels 222, and the cameras 204A and 204B.

In FIG. 2D, each of the user's eyes 224A and 224B is viewing a different point of gaze. More specifically, the user's eye 224A is viewing the point of gaze 227A (or display pixel and/or display subpixel 222"), and the user's eye 224B is viewing the point of gaze 227B (or display pixel and/or display subpixel 222'). Further, the user's gaze directions 226A and 226B are crossed. When an eye tracking module detects that a user's gaze directions cross, the eye tracking module may determine that the user has esotropia, a condition where one or both of a user's eyes turn inward such that a user appears "cross-eyed." Where the esotropia impairs the user's ability to see the display 202 clearly, the eye tracking module may trigger the display 202 to modify the visual information displayed on the display 202 such that the user can more clearly see the visual information. In other words, the display 202 may serve as a corrective lens while displaying visual information to the user.

Figure 2E:
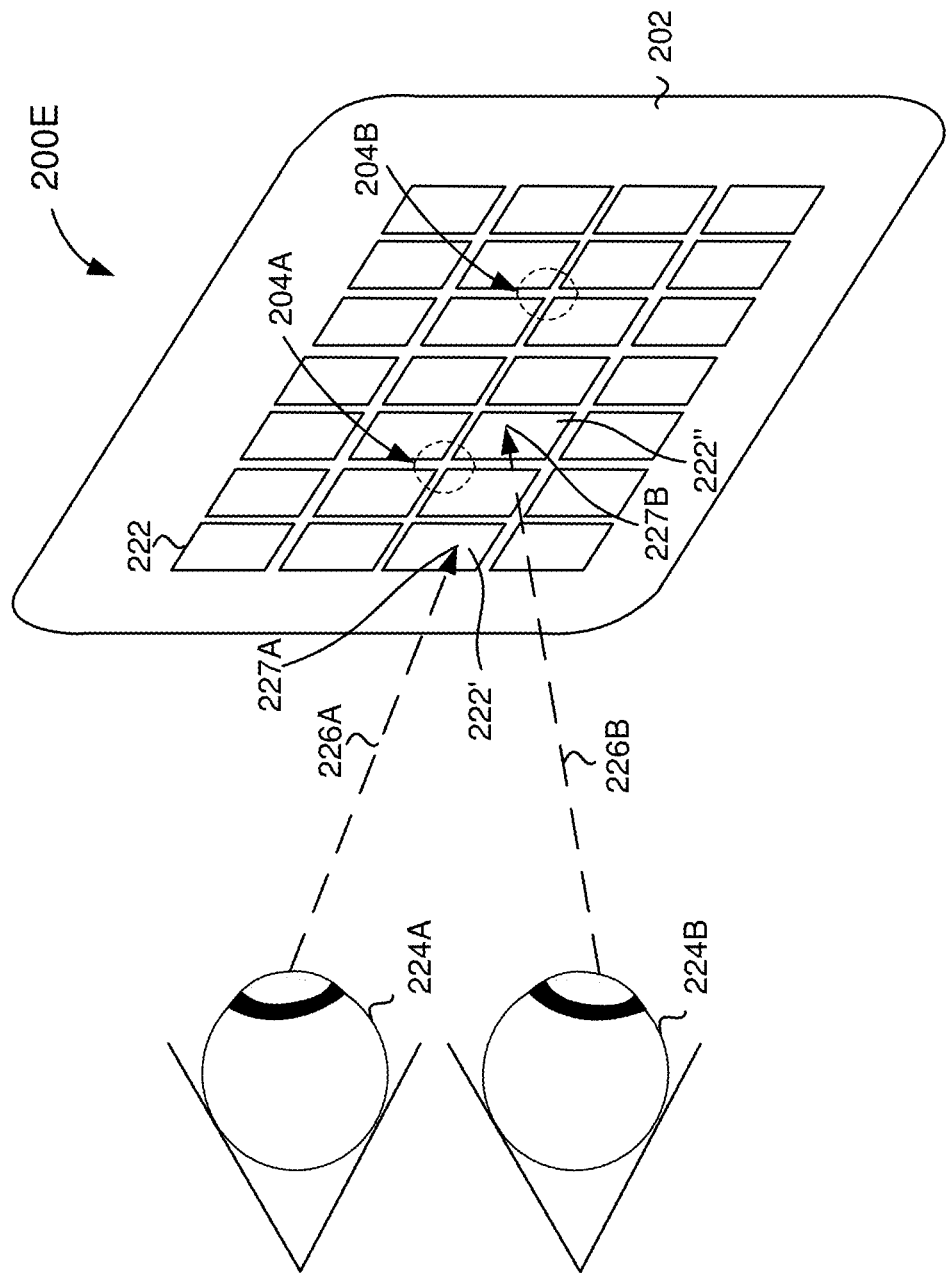

FIG. 2E shows an application of an example electronic system 200E, in accordance with some embodiments. The electronic system 200E may be an embodiment of any, or a combination of, the electronic systems 100C-100E of FIGS. 1C-1E, and electronic systems 200C and 200D of FIGS. 2C and 2D. As shown in FIG. 2E, the electronic system 200E includes the display 202, the display pixels and/or display subpixels 222, and the cameras 204A and 204B.

In FIG. 2E, each of the user's eyes 224A and 224B is viewing a different point of gaze. More specifically, the user's eye 224A is viewing the point of gaze 227A (or display pixel and/or display subpixel 222'), and the user's eye 224B is viewing the point of gaze 227B (or display pixel and/or display subpixel 222"). Unlike FIG. 2D, the user's gaze directions 226A and 226B in FIG. 2E are not crossed, and instead diverge. When an eye tracking module detects that a user's gaze directions 226A and 226B diverge, the eye tracking module may determine that the user has exotropia, a condition where a user's eyes deviate outward. In some cases, exotropia may result in amblyopia (lazy eye). Where the exotropia impairs the user's ability to see the display 202 clearly, the eye tracking module may trigger the display 202 to modify the visual information displayed on the display 202 such that the user can more clearly see the visual information. In other words, the display 202 may serve as a corrective lens while displaying visual information to the user.

Figure 3B:
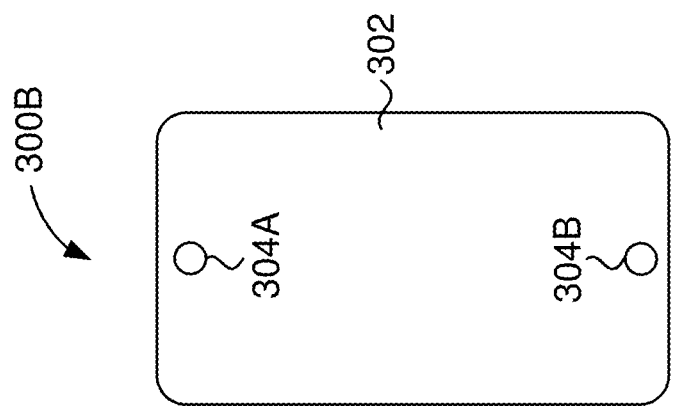
FIGS. 3A and 3B each show an example electronic system, in accordance with some embodiments.
Figure 3A:
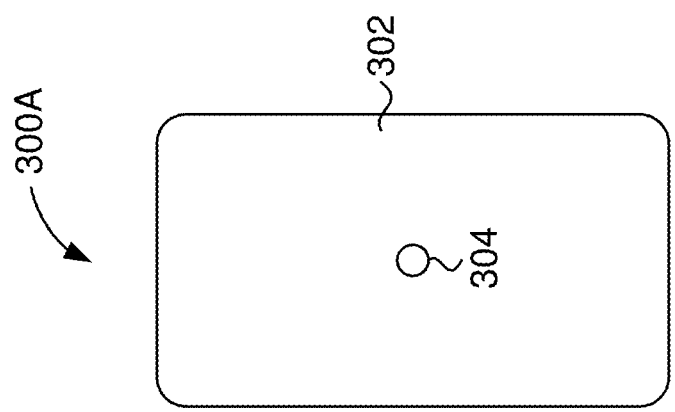

FIG. 3A shows an example electronic system 300A, in accordance with some embodiments. As shown in FIG. 3A, the electronic system 300A includes a display 302 and a camera 304. The electronic system 300A may be an embodiment of any, or a combination of the electronic systems 100A and 100B of FIGS. 1A and 1B, and electronic systems 200A and 200B of FIGS. 2A and 2B. Thus, the display 302 may be an embodiment of the displays 102 and 202 of FIGS. 1A-1B and FIGS. 2A-2B, respectively. Further, the camera 304 may be an embodiment of the cameras 104 and 204 of FIGS. 1A-1B and FIGS. 2A-2B, respectively. The display 302 may comprise a porous display, such as an OLED display or micro-LED display, which contains holes or gaps between display pixels and/or display subpixels (display pixels and display subpixels not shown for clarity). The camera 304 is disposed near the center of the electronic system 300A, under the display 302. The camera 304 may have a FOV sufficiently wide to view one or both of a user's eyes, depending on the distance between the camera 304 and the user's eyes. Further, the camera 304 may be capable of supporting eye tracking.

During operation, a user may hold the electronic system 300A in the user's hand or place the electronic system 300A on a support, while the user looks at the display 302. Because the camera 304 is disposed in the center of the display 302, the camera 304 may be able to view the full area of a user's eye(s). As a result, the electronic system 300A may be able to more accurately determine the position and/or orientation of the user's eye(s) relative to the display 302, which may enhance eye tracking. The electronic system 300A may perform eye tracking in a manner similar to that of any, or a combination of, the electronic systems 100A and 100B of FIGS. 1A and 1B, and electronic systems 200A and 200B of FIGS. 2A and 2B.

FIG. 3B shows an example electronic system 300B, in accordance with some embodiments. The electronic system 300B may be an embodiment of any, or a combination of, the electronic systems 100C-100E and 200C-200E. As shown in FIG. 3B, the electronic system 300B includes the display 302 and cameras 304A and 304B, which are disposed near opposite ends of the electronic system 300B. The cameras 304A and 304B may be embodiments of the camera 304 in FIG. 3A. In some aspects, the cameras 304A and 304B may be disposed under the display 302, which may provide the cameras with a full view of a user's eye(s) when a user views the display 302. Further, because the electronic system 300B includes two cameras, the electronic system 300B may be configured to support depth sensing via stereopsis. More specifically, the electronic system 300B may be configured to sense depth information about a user's eye(s) for eye tracking. During operation, the electronic system 300B may perform eye tracking in a manner similar to that of any, or a combination of, the electronic systems 100C-100E of FIGS. 1C-1E, and electronic systems 200C-200E of FIGS. 2C-2E.

Figure 4A:
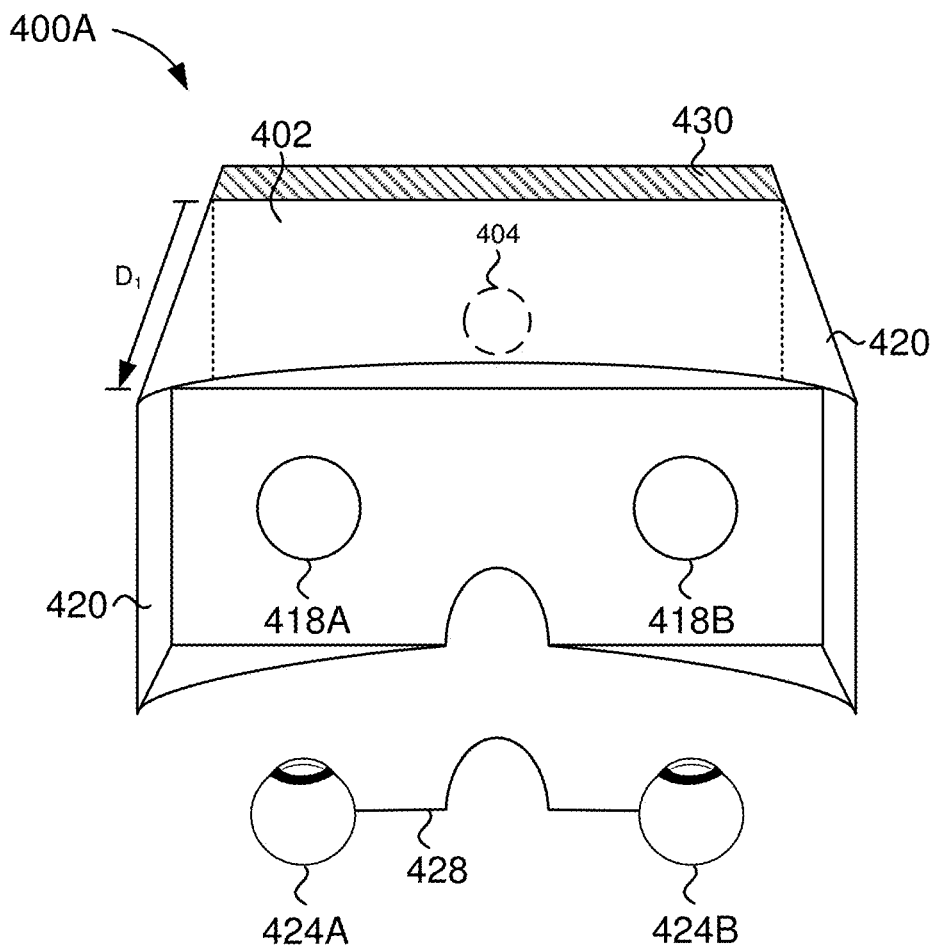
FIGS. 4A and 4B each show an example HMD, in accordance with some embodiments.

FIG. 4A shows an example HMD 400A, in accordance with some embodiments. As noted above, an HMD is an electronic display worn on or attached to a user's head. As shown in FIG. 4A, the HMD 400A includes a housing 420, lenses 418A and 418B, and a display device 430. The display device 430 may be an embodiment of any, or a combination of, the electronic systems 100A and 100B of FIGS. 1A and 1B, electronic systems 200A and 200B of FIGS. 2A and 2B, and electronic system 300A of FIG. 3A. Further, the display device 430 may include a camera 404 disposed behind a display 402. The display 402 may be an embodiment of the displays 102, 202, and 302 of FIGS. 1A-1B, 2A-2B, and 3A, respectively. Further, the camera 404 may be an embodiment of the cameras 104, 204, and 304 of FIGS. 1A-1B, 2A-2B, and 3A, respectively. The display 402 may be positioned a distance $D_1$ from the lenses 418A and 418B. The distance $D_1$ may be fixed or adjustable, and may permit the camera 404 to view either one or both of a user's eyes 424A and 424B during eye tracking.

As discussed above, aspects of the present disclosure recognize that eye tracking is enhanced where a camera is disposed behind a display of an electronic system (or display device), with a full view of a user's eye area. Thus, positioning the display and camera closer to the user's eyes may further improve eye tracking. To achieve this relationship between the display and camera, the display device 430 may be coupled to the HMD 400A, as shown in FIG. 4A. Enhanced eye tracking may improve a user's ability to interact with the display device 430 hands-free, and may be utilized in various applications involving, for example, virtual reality, augmented reality, and/or mixed reality.

During operation, a user 428 may place the HMD 400A on or against the user's head such that the user's eyes 424A and 424B peer through the lenses 418A and 418, respectively. Eye tracking may be performed as described above with reference to FIGS. 1A, 1B and/or 1E.

Figure 4B:
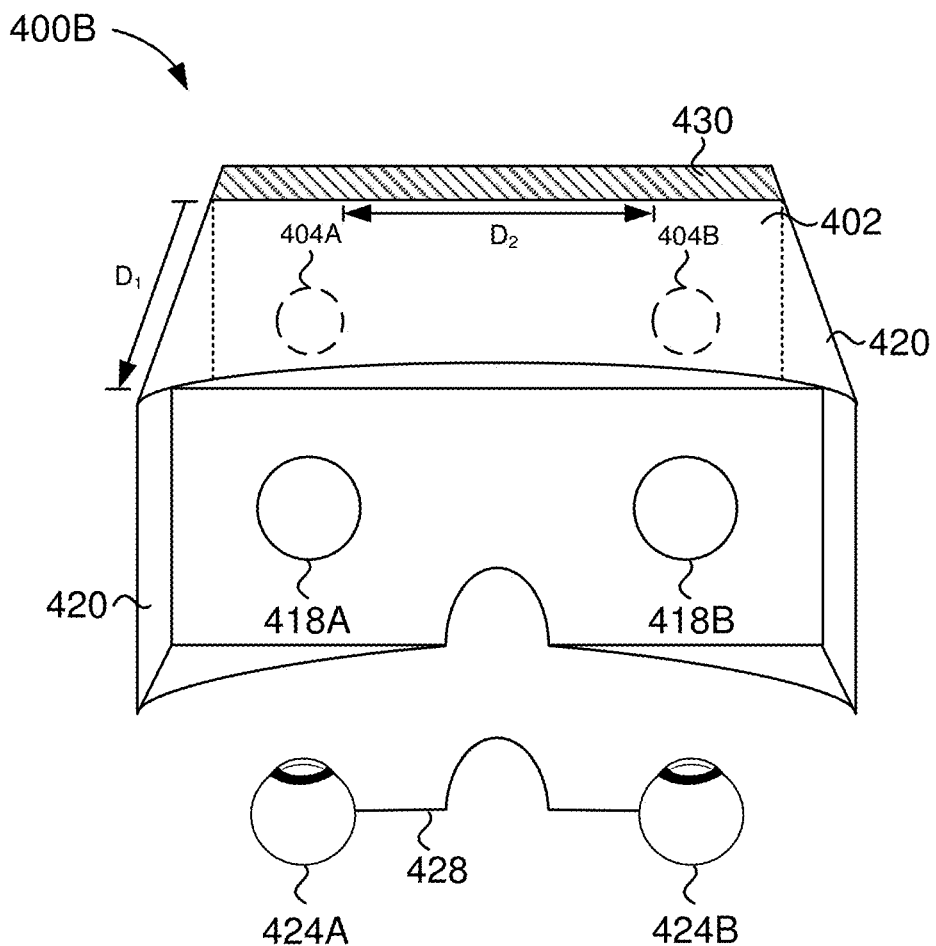

FIG. 4B shows an example HMD 400B, in accordance with some embodiments. The HMD 400B may be an embodiment of the electronic system 100E and/or HMD 400A of FIGS. 1E and 4A, respectively. Further, the display device 430 of FIG. 4B may be an embodiment of any, or a combination of, the electronic systems 100C-100E of FIGS. 1C-1E, the electronic systems 200C-200E of FIGS. 2C-2E, and electronic system 300B of FIG. 3B. As shown in FIG. 4B, the HMD 400B includes the housing 420, the lenses 418A and 418B, and the display device 430. Unlike HMD 400A of FIG. 4A, the HMD 400B includes two cameras—cameras 404A and 404B, which are separated by the distance $D_2$ and may be embodiments of the camera 404 of FIG. 4A. In some embodiments, the distance $D_2$ may be selected such that the cameras 404A and 404B are aligned with the lenses 418A and 418B, respectively. During eye tracking, such alignment may provide the cameras 404A and 404B with a direct or full view of the user's eyes 424A and 424B, respectively. Eye tracking may be performed as described above with reference to FIGS. 1C-1E, 2C-2E, and 3B.

Figure 5:
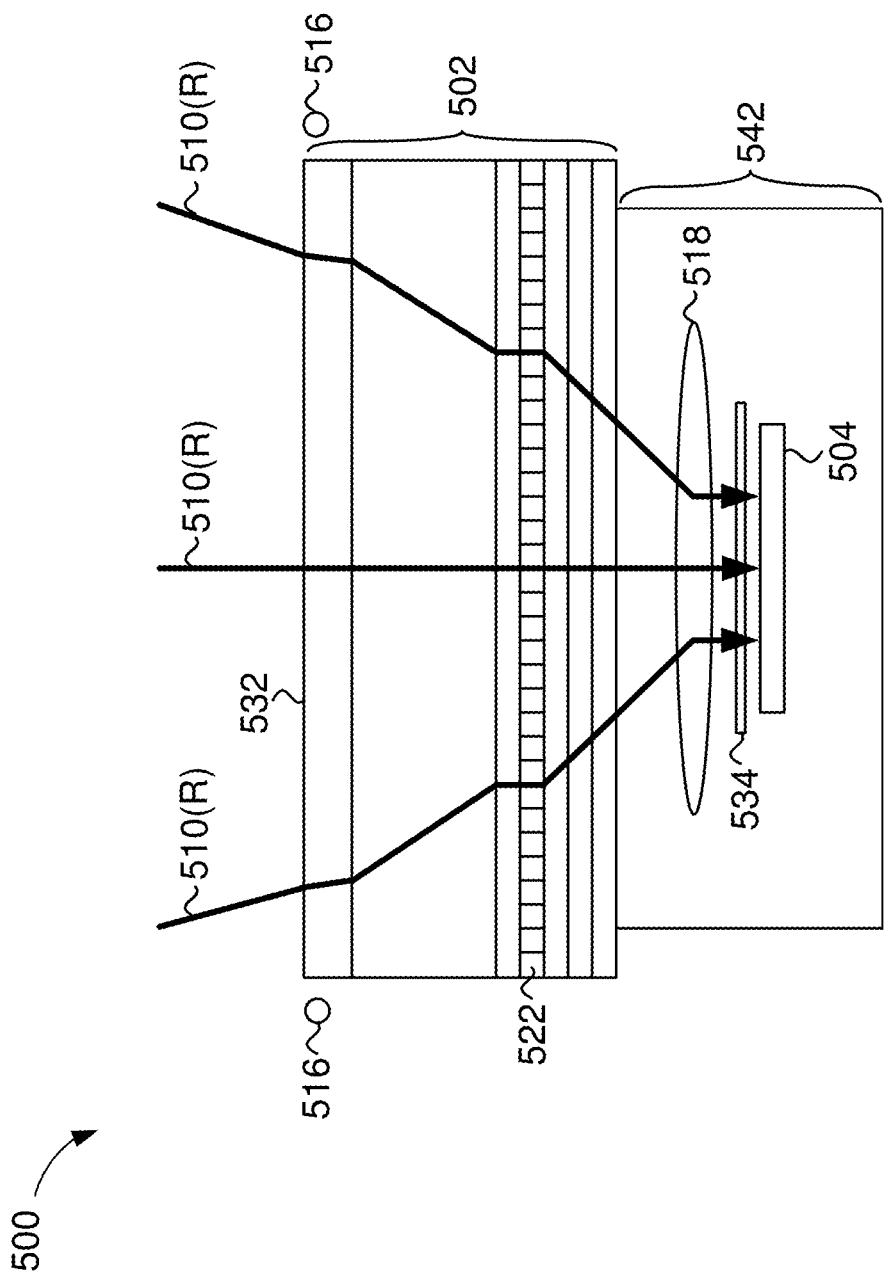
FIG. 5 shows a cross-section of an example electronic system, in accordance with some embodiments.

FIG. 5 shows a cross-section of an example electronic system 500, in accordance with some embodiments. As shown in FIG. 5, the electronic system 500 includes display layers 502, light sources 516, and a camera module 542. The electronic system 500 may be an example embodiment of any, or a combination of, electronic systems 100A and 100B of FIGS. 1A and 1B, electronic systems 200A and 200B of FIGS. 2A and 2B, electronic system 300A of FIG. 3A, and display device 430 of FIG. 4A.

The display layers 502 may comprise a plurality of layers of a porous display, such as an OLED display or a micro-LED display. As shown in FIG. 5, the display layers 502 may include a display surface 532 and an emissive layer 522. In some embodiments, the emissive layer 522 may include a plurality of display pixels and/or display subpixels, with holes, gaps, or empty space between each of the display pixels and/or display subpixels (holes, gaps, and/or spaces shown as vertical lines). In some embodiments, at least one of the display layers 502 may comprise a transparent layer configured to transmit light from an object or scene.

In some embodiments, the light sources 516 may be positioned adjacent to the display layers 502. For example, the light sources 516 may be disposed under the display layers 502, in the same plane as the display layers 502, in the bezel of the electronic system 500, or in any combination thereof. The light sources 516 may be configured to illuminate an object or scene being imaged. For example, the light sources 516 may comprise LEDs or display pixel(s) and/or display subpixel(s) (e.g., in the emissive layer 522) configured to illuminate an object or scene using IR (e.g., NIR and/or SWIR) and/or visible (e.g., red) light.

As shown in FIG. 5, the camera module 542 is disposed below the display layers 502, and includes a camera 504, an optical filter 534, and a lens 518. The camera 504 may be an embodiment of the cameras 104, 204, 304, and 404 of FIGS. 1A-1B, 2A-2B, 3A, and 4A. Further, the camera 504 may be configured for wide-range imaging, where an object or scene is imaged either close up or far away. The camera 504 may also be configured to rapidly sense objects such as eyes, fingers, hands, and heads. In some embodiments, the camera 504 may be configured to operate in multiple modes such as low-power modes to support ambient light sensing (ALS) functions.

The optical filter 534 is disposed between the camera 504 and the lens 518. The optical filter 534 may be configured to reflect and/or block certain wavelengths of light (e.g., UV light, visible light, mid-IR wavelengths, NIR and/or SWIR), such that certain wavelengths of light do not interfere with the camera 504. In some embodiments, the optical filter 534 may comprise a dual-band optical filter configured to block all wavelengths of light except for IR (e.g., NIR and/or SWIR) and/or red light. The lens 518 may be an optical lens or assembly of lenses configured to focus light passing through the display layers 502 to the camera 504.

During operation, the light sources 516 may illuminate an object (e.g., a user's eye) or scene in front of the electronic system 500. For example, the light sources 516 may emit IR light, and at least a portion of this IR light may reflect off an object or scene and travel back toward the electronic system 500 as, for example, reflected light 510(R). As shown in FIG. 5, the reflected light 510(R) may refract or bend as it passes through the display surface 532 and the emissive layer 522. In the emissive layer 522, some of the reflected light 510(R) may be occluded by the display pixels and/or display subpixels of the emissive layer 522, but at least some of the reflected light 510(R) may pass through holes or empty space between the display pixels and/or display subpixels. The remaining reflected light 510(R) then travels through the remaining display layers 502, the lens 518, and the optical filter 534, to the camera 504. The camera 504 may capture the reflected light 510(R) as an image.

Aspects of the present disclosure recognize that by disposing the camera 504 below the display layers 502, images captured by the camera 504 may include a "screen door effect," noise, distortion, interference, or other artifacts caused by occlusions in the display layers 502. Further, the captured images may include features such as eye lashes or eye lids that may hinder eye tracking by obscuring a user's pupil, iris, or other eye features. As described in more detail below, an image filter (e.g., a neural network model or other algorithm, not shown for simplicity) may be used to filter such interferences, distortions, or features. Once a captured image is filtered, it may be transferred to, for example, an eye tracking module (not shown for simplicity) or other module for further processing. The eye tracking module may analyze the filtered image to detect at least one eye of the user. The eye tracking module may also determine and output eye tracking information, such as the eye's position, orientation, movement, gaze direction and point of gaze. The eye tracking module may also receive subsequent images (e.g., still images and/or video) from the camera 504 to track the eye's movement over time.

Figure 6:
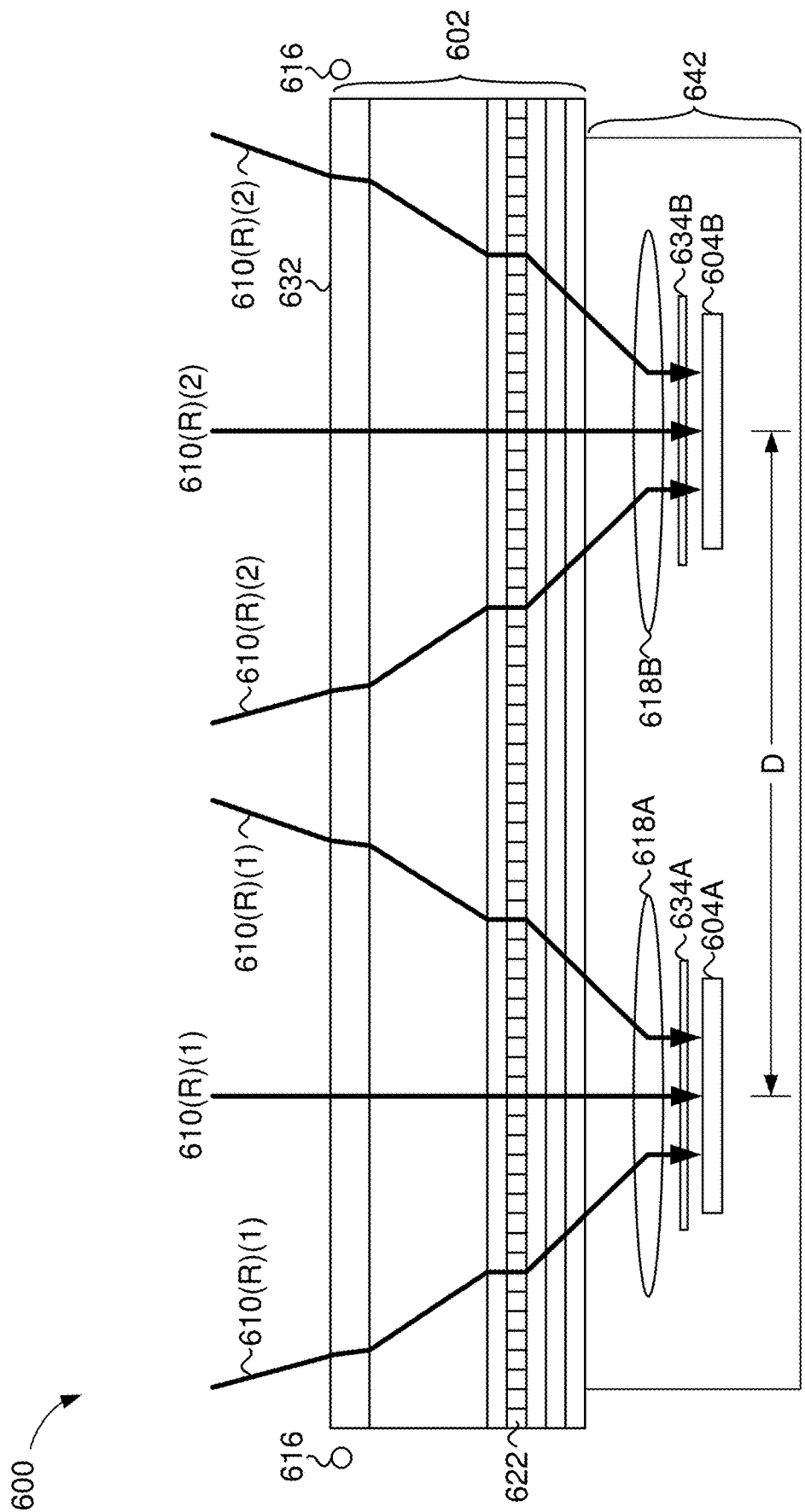
FIG. 6 shows a cross-section of an example electronic system, in accordance with some embodiments.

FIG. 6 shows a cross-section of an example electronic system 600, in accordance with some embodiments. The electronic system 600 may be an embodiment of any, or a combination of, the electronic systems 100C-100E of FIGS. 1C-1E, electronic systems 200C-200E of FIGS. 2C-2E, electronic system 300B of FIG. 3B, display device 430 of FIG. 4B, and electronic system 500 of FIG. 5. As shown in FIG. 6, the electronic system 600 includes display layers 602, light sources 616, and a camera module 642. The display layers 602 may be an embodiment of the display layers 502 in FIG. 5. The display layers 602 may include a display surface 632 and an emissive layer 622. The display surface 632 may be an embodiment of the display surface 532 in FIG. 5, and the emissive layer 622 may be an embodiment of the emissive layer 522 in FIG. 5. The camera module 642 may be an embodiment of the camera module 542 in FIG. 5. The camera module 642 may include lenses 618A and 618B, optical filters 634A and 634B, and cameras 604A and 604B. Each of the lenses 618A and 618B may be an embodiment of the lens 518 of FIG. 5, and each of the optical filters 634A and 634B may be an embodiment of the optical filter 534 of FIG. 5. Further, each of the cameras 604A and 604B may be an embodiment of the camera 504 in FIG. 5. Because the electronic system 600 includes two cameras, the cameras 604A and 604B may be configured to support depth sensing to enhance eye tracking. The resolution of the depth sensing may depend on the distance of separation D between the cameras 604A and 604B. In other words, the greater the distance D, the greater the amount of depth information that can be derived from the cameras 604A and 604B. The light sources 616 may be embodiments of the light sources 516 of FIG. 5.

During operation, the light sources 616 may emit light to illuminate an object or scene in front of the cameras 604A and 604B. In some embodiments, the light emitted by the light sources 616 may be modulated or encoded. Objects in the scene (e.g., the user's eye(s)) may reflect at least a portion of the light back towards the display surface 632, for example, as reflected light 610(R)(1) and 610(R)(2). Some of the reflected light 610(R)(1) and 610(R)(2) may be occluded by display pixels and/or display subpixels in the emissive layer 622, while the remainder of the reflected light 610(R)(1) and 610(R)(2) passes through holes or gaps between the display pixels and/or display subpixels, and is detected by the cameras 604A and 604B, respectively (holes, gaps, and/or spaces shown as vertical lines in the emissive layer 622). Each of the cameras 604A and 604B may capture their respective reflected light as a separate image, and these images may be transferred to an image filter. As described above with respect to FIG. 5, the image filter (e.g., a neural network model or other algorithm, not shown for simplicity) may remove noise, interference, or distortion in the images. However, unlike FIG. 5, the electronic system 600 may be configured to support depth sensing. As a result, the filtered images may be transferred to a depth map generator, which may combine the images and extract depth information about the objects in the images for depth sensing. The depth information may be output as a depth map. Subsequently, the depth map may be transferred to an eye tracking module or other module for further processing. The eye tracking module may analyze the depth map to detect at least one eye of the user. The eye tracking module may also determine and output eye tracking information, which may include, for example, the eye's position, orientation, movement, gaze direction and point of gaze. The eye tracking module may also receive subsequent depth maps (e.g., still and/or animated depth maps) to track the eye's movement over time.

Figure 7A:
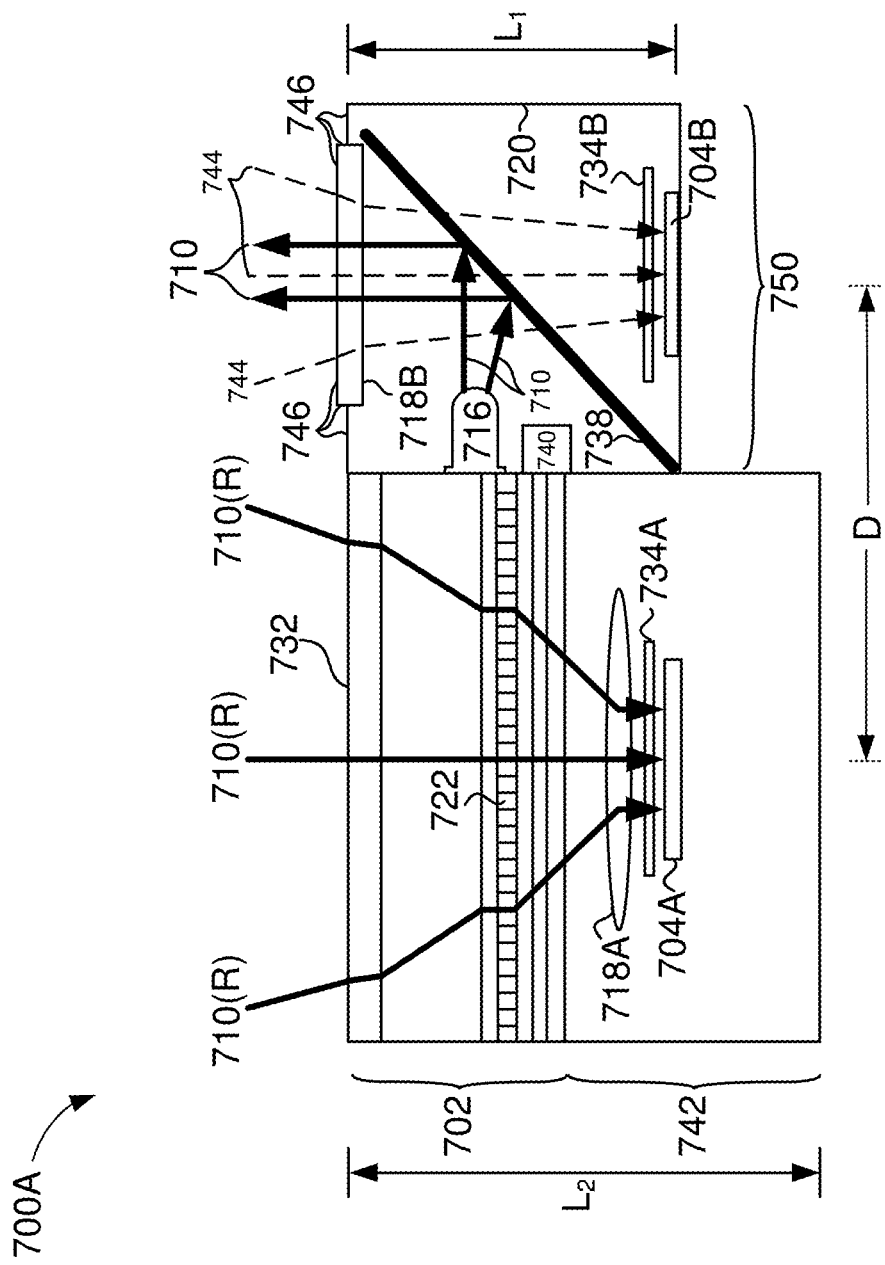
FIGS. 7A and 7B each show a cross-section of an example electronic system, in accordance with some embodiments.

FIG. 7A shows a cross-section of an example electronic system 700A, in accordance with some embodiments. The electronic system 700A may be an embodiment of any, or a combination of, the electronic systems 100C-100E of FIGS. 1C-1E, electronic systems 200C-200E of FIGS. 2C-2E, electronic system 300B of FIG. 3B, display device 430 of FIG. 4B, electronic system 500 of FIG. 5, and electronic system 600 of FIG. 6. As shown in FIG. 7A, the electronic system 700A includes display layers 702, a camera module 742, and a camera assembly 750.

The display layers 702 may comprise a plurality of layers of a porous display, such as an OLED display or a micro-LED display, and the display layers 702 include a display surface 732 and an emissive layer 722. The display layers 702 may be an embodiment of the display layers 502 and/or 602 of FIGS. 5 and 6, the emissive layer 722 may be an embodiment of the emissive layer 522 and/or 622 of FIGS. 5 and 6, and the display surface 732 may be an embodiment of the display surface 532 and/or 632 of FIGS. 5 and 6.

The camera module 742 includes a camera 704A, optical filter 734A, and lens 718A. The camera module 742 may be an embodiment of the camera module 542 and/or 642 of FIGS. 5 and 6. The camera 704A may be an embodiment of the camera 504 of FIG. 5 and/or the cameras 604A and 604B of FIG. 6. The optical filter 734A may be an embodiment of the optical filter 534 of FIG. 5 and/or the optical filters 634A and 634B of FIG. 6. The lens 718A may be an embodiment of the lens 518 of FIG. 5 and/or the lenses 618A and 618B of FIG. 6.

The camera assembly 750 includes a light source 716, reflector 738, lens 718B, camera 704B, proximity sensor 740, and housing 720. Further, the length L1 is the length of the housing 720, as measured from the top of the housing 720, at a first surface 746, to the base of the housing 720, near the camera 704B. In some embodiments, it may be advantageous to minimize the length L1 of the housing 720. Further, while the length L1 appears to be shorter than the length L2 (which spans the length of the display layers 702 and camera module 742), L1 may be nearly any length shorter than, equal to, or longer than length L2. In addition, while the camera assembly 750 is shown adjacent to the display layers 702 and the camera module 742, in actual implementations, components (not shown) may separate the camera assembly 750 from the display layers 702 and camera module 742.

The light source 716 is disposed inside the housing 720, and may comprise a LED, a vertical-cavity surface-emitting laser (VCSEL), a laser diode, or other light source capable of emitting wavelengths of light in the IR spectrum (e.g., NIR and/or SWIR) and/or the visible spectrum. Because the light source 716 is positioned within the housing 720, the electronic system 700A may not require an extra notch or cutout in the display surface 732 or in a bezel of the display layers 702 to accommodate the light source 716. In addition, because the light source 716 is disposed proximate to the display layers 702, when a user views the display surface 732, light emitted from the light source 716 may fully illuminate a user's eye area. Thus, the configuration of the light source 716 in the electronic system 700A may provide enhanced illumination for eye tracking.

The reflector 738 is configured to reflect light 710 emitted by the light source 716 away from the camera 704B, and to transmit visible light 744 from the lens 718B to the camera 704B. In some embodiments, the reflector 738 may comprise a reflective plane, dichroic reflector, and/or dichroic mirror. In other embodiments, the reflector 738 may comprise a beam splitter.

The lens 718B is an optical lens or assembly of lenses. The lens 718B may be configured to transmit visible light 744 in front of the lens 718B (i.e. outside of the housing 720) to the camera 704B, and to focus the visible light 744 onto the camera 704B. The lens 718B may also be configured to transmit IR light in front of the lens 718B to the proximity sensor 740. In addition, the lens 718B may be configured to transmit the light 710 emitted by the light source 716 and reflected by the reflector 738.

The camera 704B may comprise an array of active pixel sensors or photosensors (e.g., photodiodes, CMOS image sensor arrays, CCD arrays, and/or any other sensors capable of detecting wavelengths of light in the visible spectrum, the IR spectrum, or the UV spectrum). In some aspects, the camera 704B may be configured to detect visible light. In some other aspects, the camera 704B may be configured to detect visible light 744 while the light source 716 emits IR light 710. In still other aspects, the camera 704B may be configured to perform wide-range imaging, where an object or scene is imaged either close up or far away.

The optical filter 734B is disposed between the camera 704B and the lens 718B. The optical filter 734B may be an IR cut filter. The optical filter 734B may be configured to reflect and/or block wavelengths of light (e.g., mid-IR wavelengths, NIR and/or SWIR), such that IR light does not interfere with the camera 704B.

The proximity sensor 740 may comprise an array of active pixel sensors or photosensors (e.g., photodiodes, CMOS image sensor arrays, CCD arrays, and/or any other sensors capable of detecting wavelengths of light in the visible spectrum, the IR spectrum, and/or the UV spectrum). Further, the proximity sensor 740 may be configured to detect reflections of IR light 710 emitted by the light source 716 to rapidly sense objects (e.g., eyes, fingers, hands, and heads) near the electronic system 700A.

The housing 720 may comprise a structure that surrounds the lens 718B and encloses the light source 716, reflector 738, optical filter 734B, and the camera 704B.

During operation, the light source 716 may emit, for example, IR light 710, which reflects off the reflector 738 and passes through the lens 718B. As noted above, the IR light 710 may fully illuminate a user's eyes when the user views the display surface 732. The user's eyes may reflect at least a portion of the IR light 710 back towards the display layers 702, for example, as reflected light 710(R). Some of the reflected light 710(R) may pass through the display layers 702, lens 718A and optical filter 734A, be detected by the camera 704A, and captured as an image. In some embodiments, at substantially the same time that the light source 716 emits the IR light 710, the camera 704B may detect visible light 744 (e.g., from the sun or another light source) that reflects off the user's eyes or other objects in the scene and capture the visible light 744 in an image. The images captured by the cameras 704A and 704B may be used for eye tracking. Further, because the light source 716 and cameras 704A and 704B may be positioned within or near the user's line of sight when the images are captured, the images may depict the position and/or orientation of the user's eyes relative to the display surface 732 with a high degree of precision. Thus, the captured images may facilitate more accurate eye tracking.

Figure 7B:
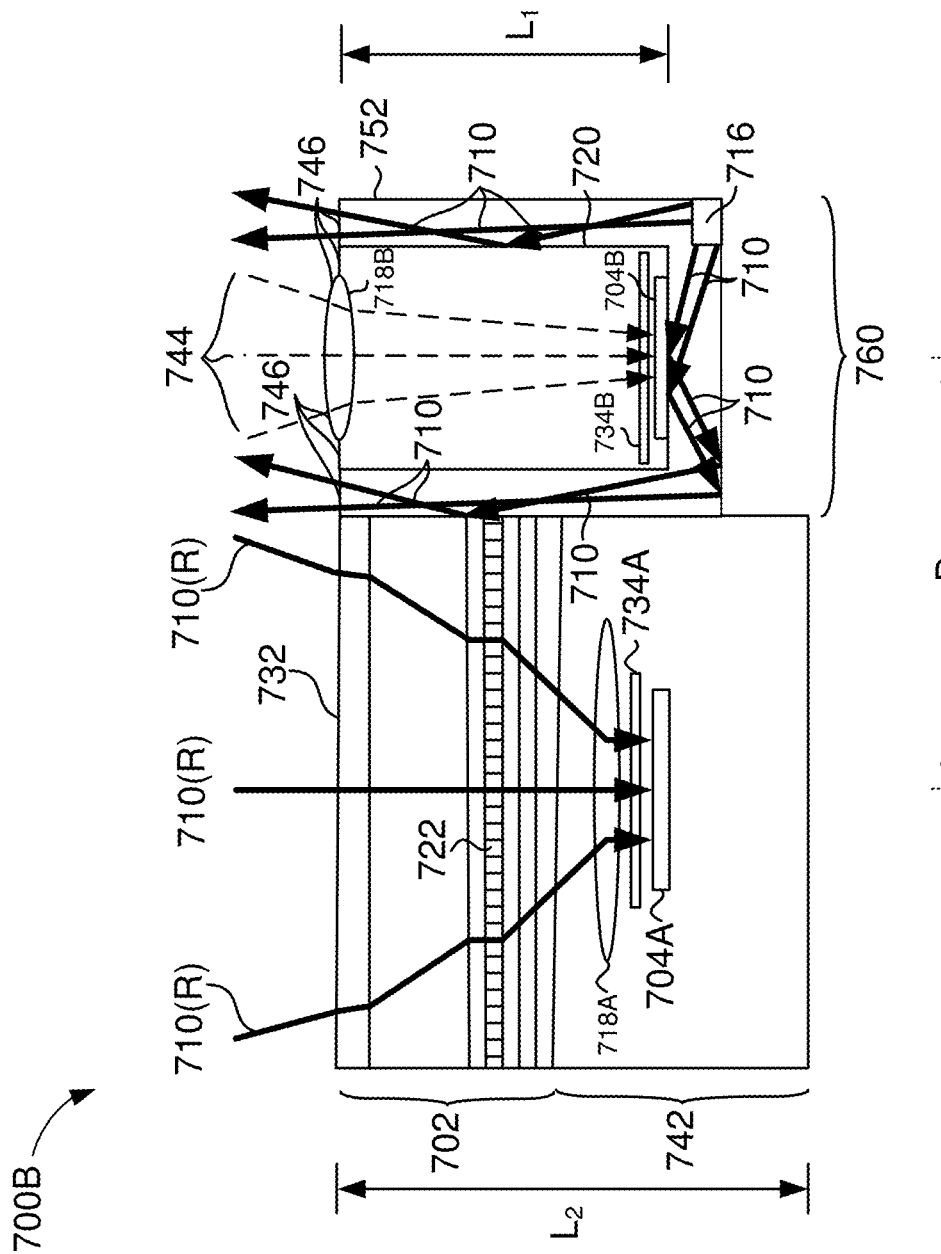

FIG. 7B shows a cross-section of an example electronic system 700B, in accordance with some embodiments. The electronic system 700B may be an embodiment of any, or a combination of, the electronic systems 100C-100E of FIGS. 1C-1E, the electronic systems 200C-200E of FIGS. 2C-2E, the electronic system 300B of FIG. 3B, the display device 430 of FIG. 4B, and the electronic systems 600 and 700A of FIGS. 6 and 7A. As shown in FIG. 7B, the electronic system 700B includes the display layers 702, the camera module 742, and a camera assembly 760.

The camera assembly 760 includes the light source 716, a light guide 752, the lens 718B, the camera 704B, the optical filter 734B, and the housing 720. In some embodiments, the camera assembly 760 may further include additional light sources, a diffuse surface, micro-lenses, an ambient sensor, and/or a proximity sensor.

The light source 716 may be coupled to the light guide 752 and configured to emit IR light 710. The light source 716 may comprise an LED, VCSEL, laser diode, or other light source capable of emitting wavelengths of light in the visible spectrum and/or the IR spectrum including but not limited to NIR or SWIR. Because the light source 716 is positioned within the light guide 752, the electronic system 700B may not require an extra notch or cutout in the display surface 732 or in a bezel of the display layers 702 to accommodate the light source 716. In addition, because the light source 716 is disposed proximate to the display layers 702, when a user views the display surface 732, light emitted from the light source 716 may fully illuminate a user's eye area. Thus, the configuration of the light source 716 in the electronic system 700B may provide enhanced illumination for eye tracking.

The light guide 752 may be configured to steer the IR light 710 out of the camera assembly 760. In some aspects, the light guide 752 may comprise a transparent material such as transparent polycarbonate. Further, the light guide 752 may be configured to reflect light. For example, in some embodiments, the light guide 752 may be configured to reflect light where interior surfaces of the light guide 752 (which may include exterior surfaces of the housing 720) have a refractive index that is greater than a refractive index of interior surfaces of the housing 720. As another example, the light guide 752 may be configured to reflect light where interior surfaces of the light guide 752 (which may include exterior surfaces of the housing 720) comprise reflective surfaces while the interior surfaces of the housing 720 comprise dark surfaces or surfaces capable of absorbing visible or IR (e.g., NIR and/or SWIR) light. In some aspects, the light guide 752 may comprise mirrors and/or reflectors. Further, the light guide 752 may be coupled (e.g., via molding) to the housing 720.

The lens 718B is an optical lens or assembly of lenses configured to transmit visible light 744 from outside the camera assembly 760 to the camera 704B, and to focus the visible light 744 onto the camera 704B. In some aspects, the lens 718B may comprise acrylic. The camera 704B may be an embodiment of the camera 704B of FIG. 7A.

The optical filter 734B is disposed between the camera 704B and the lens 718B. The optical filter 734B may comprise an IR cut filter. The optical filter 734B may be configured to reflect and/or block IR wavelengths of light (e.g., mid-IR wavelengths, NIR, and/or SWIR) such that IR light does not interfere with the camera 704B.

The housing 720 surrounds the lens 718B and encloses the optical filter 734B and the camera 704B. As noted above, the interior surfaces of the housing 720 (e.g., walls facing the camera 704B) may comprise dark surfaces or surfaces configured to absorb visible or IR (e.g., NIR and/or SWIR) light. As shown in FIG. 7B, a first surface 746 is formed by the top of the housing 720, the top of the lens 718B, and the top of the light guide 752. Further, the length L1 is the length of the housing 720, as measured from the top of the housing 720, at the first surface 746, to the base of the housing 720, near the camera 704B. In some aspects, it may be advantageous to minimize the length L1 of the housing 720. Further, while the length L1 appears to be shorter than the length L2 (which spans the length of the display layers 702 and camera module 742), L1 may be nearly any length shorter than, equal to, or longer than length L2.

During operation, the light source 716 may emit IR light (e.g., NIR and/or SWIR) 710, which is steered through the light guide 752 and the first surface 746. The IR light 710 may illuminate a user's eyes in front of the cameras 704A and 704B. The user's eyes may reflect at least a portion of the IR light 710 back toward the display layers 702, for example, as reflected IR light 710(R). Some of the reflected IR light 710(R) may pass through the display layers 702, lens 718A and optical filter 734A, be detected by the camera 704A, and captured as an image. In some embodiments, at substantially the same time that the light source 716 emits the IR light 710, the camera 704B may detect visible light 744 (e.g., from the sun or another light source) that reflects off the objects in the scene, and capture the visible light 744 in an image. The images captured by the cameras 704A and 704B may be used for eye tracking. Further, because the light source 716 and cameras 704A and 704B may be positioned within or near the user's line of sight when the images are captured, the images may depict the position and/or orientation of the user's eyes relative to the display surface 732 with a high degree of precision. Thus, the captured images may provide for more accurate eye tracking.

Figure 8:
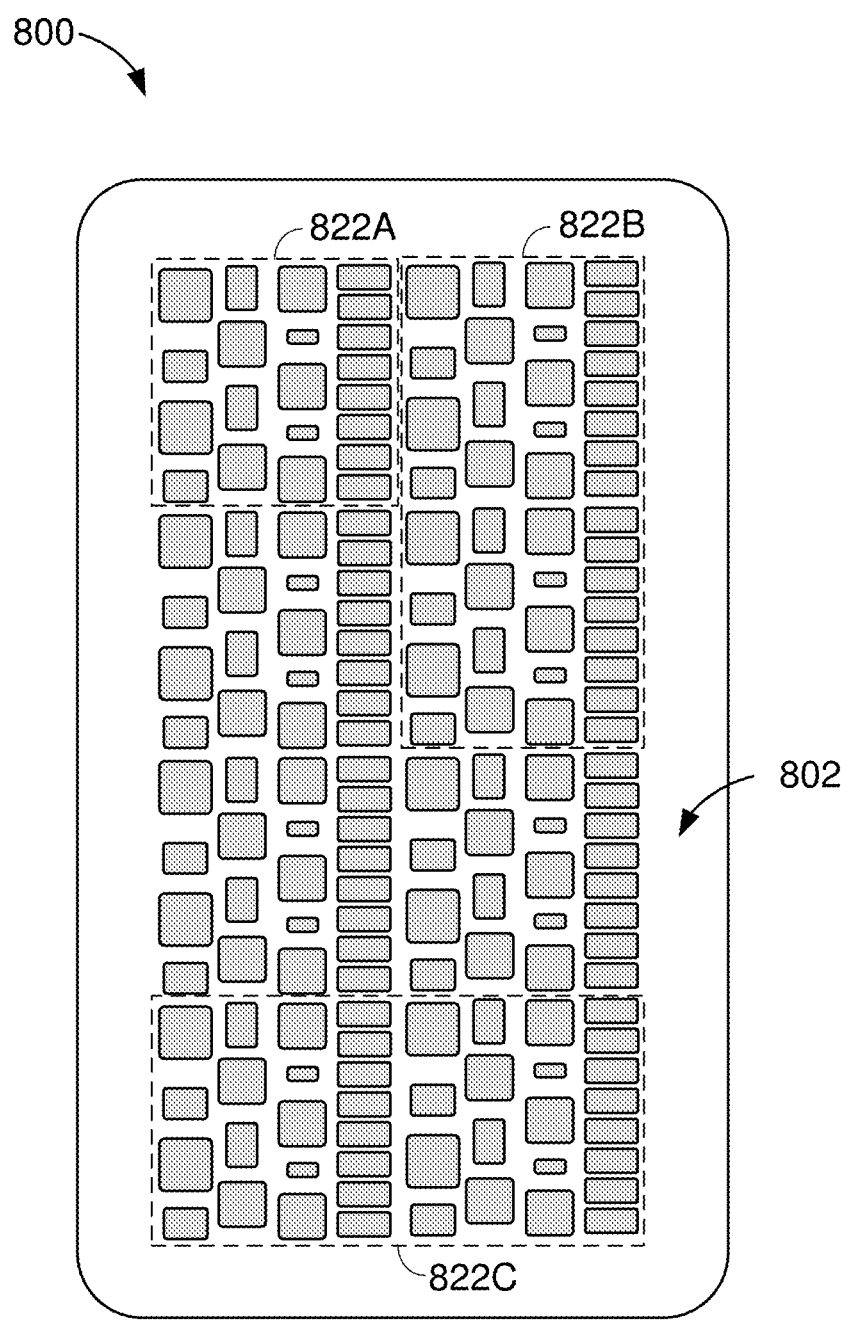
FIG. 8 shows an example display of an electronic system, in accordance with some embodiments.

FIG. 8 shows a display of an electronic system 800, in accordance with some embodiments. The electronic system 800 may be an example embodiment of any, or a combination of, the electronic systems 100A-300B, display device 430, and electronic systems 500-700B in FIGS. 1A-7B.

The electronic system 800 may include a display 802. The display 802 may be a porous display including, but not limited to, an OLED display or a micro-LED display. In other words, the display 802 may include display pixels and/or display subpixels (depicted in FIG. 8 as gray rectangles) separated by holes, gaps, or empty space. As shown in FIG. 8, the pattern of display pixels and/or display subpixels may vary over a limited region 822A of the display 802. However, aspects of the present disclosure recognize that the pattern may repeat over larger regions 822B and 822C of the display 802. Aspects of the present disclosure further recognize that distortion in a captured image may appear random and/or inconsistent due to variations in the pattern of display pixels and/or display subpixels. However, by aligning under-display optical sensing elements (e.g., optical sensing elements 1004 of FIG. 10) with the repeating pixel pattern, the variations in distortion will be the same or substantially similar across each optical sensing element. Further, it may be desirable to filter out these distortions from captured images to perform eye tracking. The display pixels and/or display subpixels may vary in shape and size, and they may be arranged in rows and columns, in a circular configuration, or in another configuration.

Figure 9:
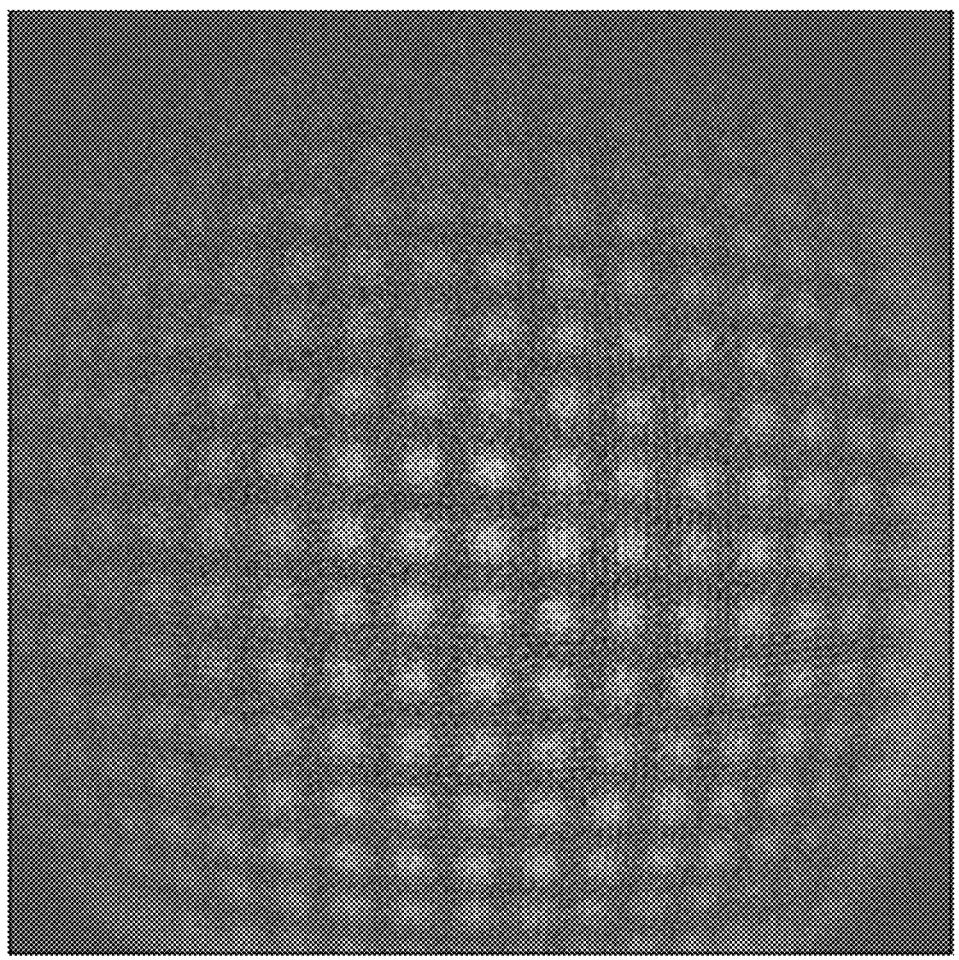
FIG. 9 shows an example image captured by a camera disposed under a display, in accordance with some embodiments.

FIG. 9 shows an example image 900 captured by a camera disposed under a display, in accordance with some embodiments. The image 900 may be captured by a camera disposed behind or beneath a porous display, as shown, for example, in FIG. 2A, with the camera 204 behind the display 202. As shown in FIG. 9, the image 900 includes a grid of dark lines and light dots—or a "screen door effect." The dark lines correspond to a pattern of display pixels and/or display subpixels, similar to the display pixel pattern depicted in FIG. 8. The dark lines are produced by the display pixels and/or display subpixels blocking some IR light from passing through the display. In contrast, the brighter dots correspond to gaps or holes between the display pixels and/or display subpixels. The bright dots are produced by IR light passing through the holes or gaps in the display to the camera below.

In some embodiments, an image captured by an under-display camera may include a grid or screen door effect that appears as though the under-display camera is simultaneously imaging through multiple layers of screen doors (or a stack of screen doors), where each screen door layer has a different pitch (i.e. hole-size or density). In such embodiments, IR light may pass through holes (or gaps) between display pixels and/or display subpixels of the screen door layers. Further, each point of IR light is spread horizontally and vertically into a different position (i.e., as a point spread function), and each point of IR light is spread in a similar fashion across the image, which may result in significant distortion. As noted above, it may be desirable to filter out such distortion from the captured image in order to use the image for eye tracking.

As shown in FIG. 9, portions of the image 900 are occluded by the display pixels and/or display subpixels of the display. In other words, the display pixels and/or display subpixels may reduce the amount of IR light available for sensing, and effectively obstruct the FOV of the under-display camera. Thus, it may be desirable to filter the images captured by the under-display camera in order to eliminate the screen door effect, interference, distortion, or other artifacts that may obscure features used for eye tracking.

Figure 10:
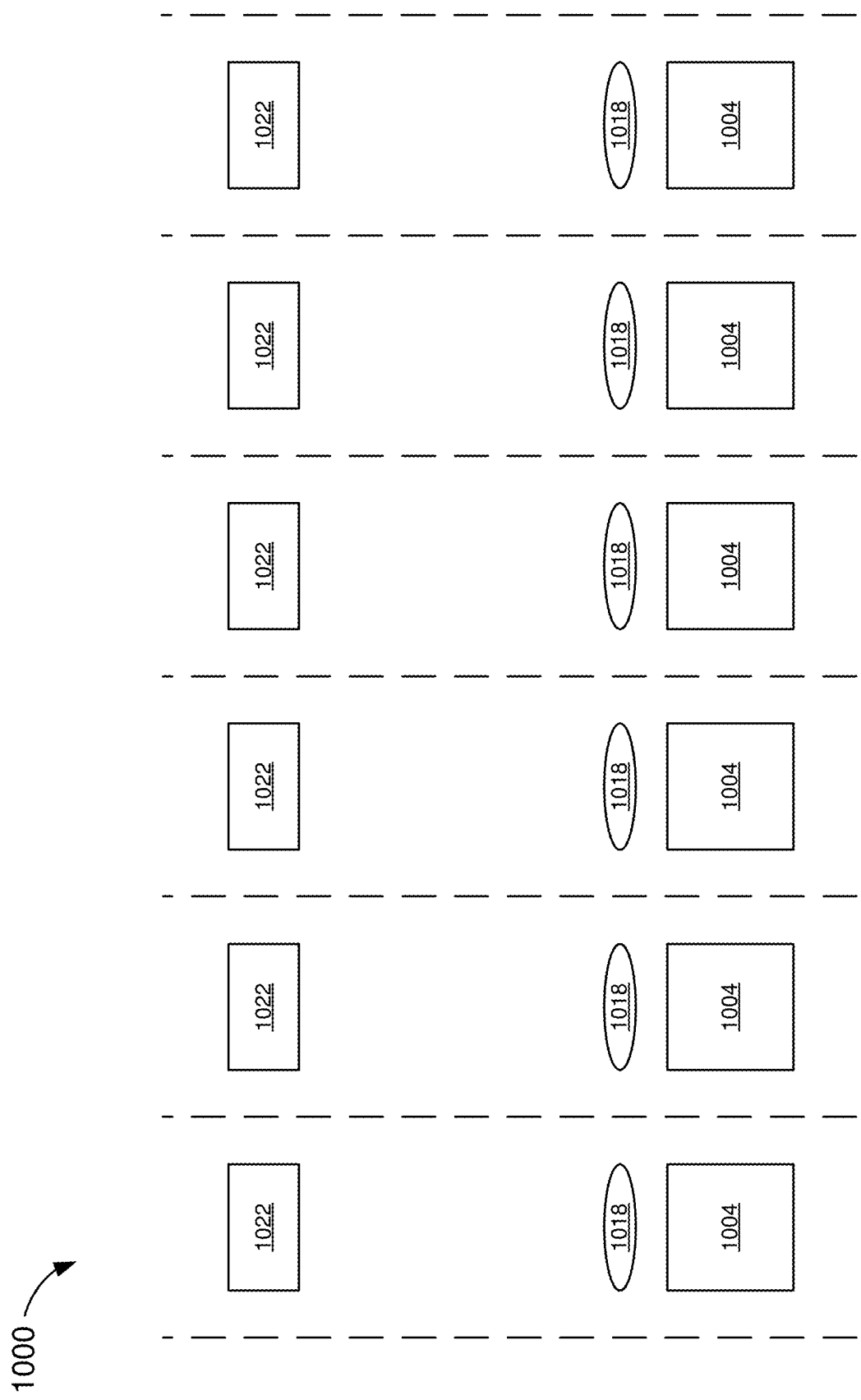
FIG. 10 shows an example arrangement of display pixels and/or display subpixels and optical sensing elements, in accordance with some embodiments.

FIG. 10 shows an example arrangement 1000 of display pixels and/or display subpixels 1022 ("display pixels 1022") and optical sensing elements 1004, in accordance with some embodiments. Each of the display pixels 1022 may be an example embodiment of the display pixels and/or display subpixels 222 in FIGS. 2A-2E and/or the display pixels and/or display subpixels in emissive layers 522, 622, 722 in FIGS. 5-7B. The optical sensing elements 1004 may be, individually or collectively, an embodiment of any under-display camera described herein, such as the camera 204 of FIG. 2A.

In some embodiments, the display pixels 1022 may be part of a porous display such as, for example, an OLED display or a micro-LED display. Each of the optical sensing elements 1004 may comprise, for example, a NIR CMOS sensor, and each optical sensing element 1004 may have a corresponding micro-lens 1018. While only six display pixels 1022 are shown in FIG. 10, in actual embodiments, the arrangement 1000 may include nearly any number of display pixels 1022 (e.g., hundreds, thousands, millions, or more), and a corresponding number of optical sensing elements 1004 and micro-lenses 1018.

In the example of FIG. 10, the display pixels 1022 may be aligned with the optical sensing elements 1004. In some embodiments, each of the optical sensing elements 1004 may be aligned with a region of a display containing a repeating pixel pattern, such as the example region 822B or 822C of FIG. 8. Due to the alignment, the screen door effect or other distortion may appear as a consistent or repeating pattern in images captured by the optical sensing elements 1004. Aspects of the present disclosure recognize that a repeating pattern of distortion may be easier to filter out from captured images. For example, neural network models may be more easily trained to recognize repeating patterns in images and may provide more robust filtering of the screen door effect when the pattern is repeated. Accordingly, the filtered images may be used to detect and track a user's eyes.

Figure 11:
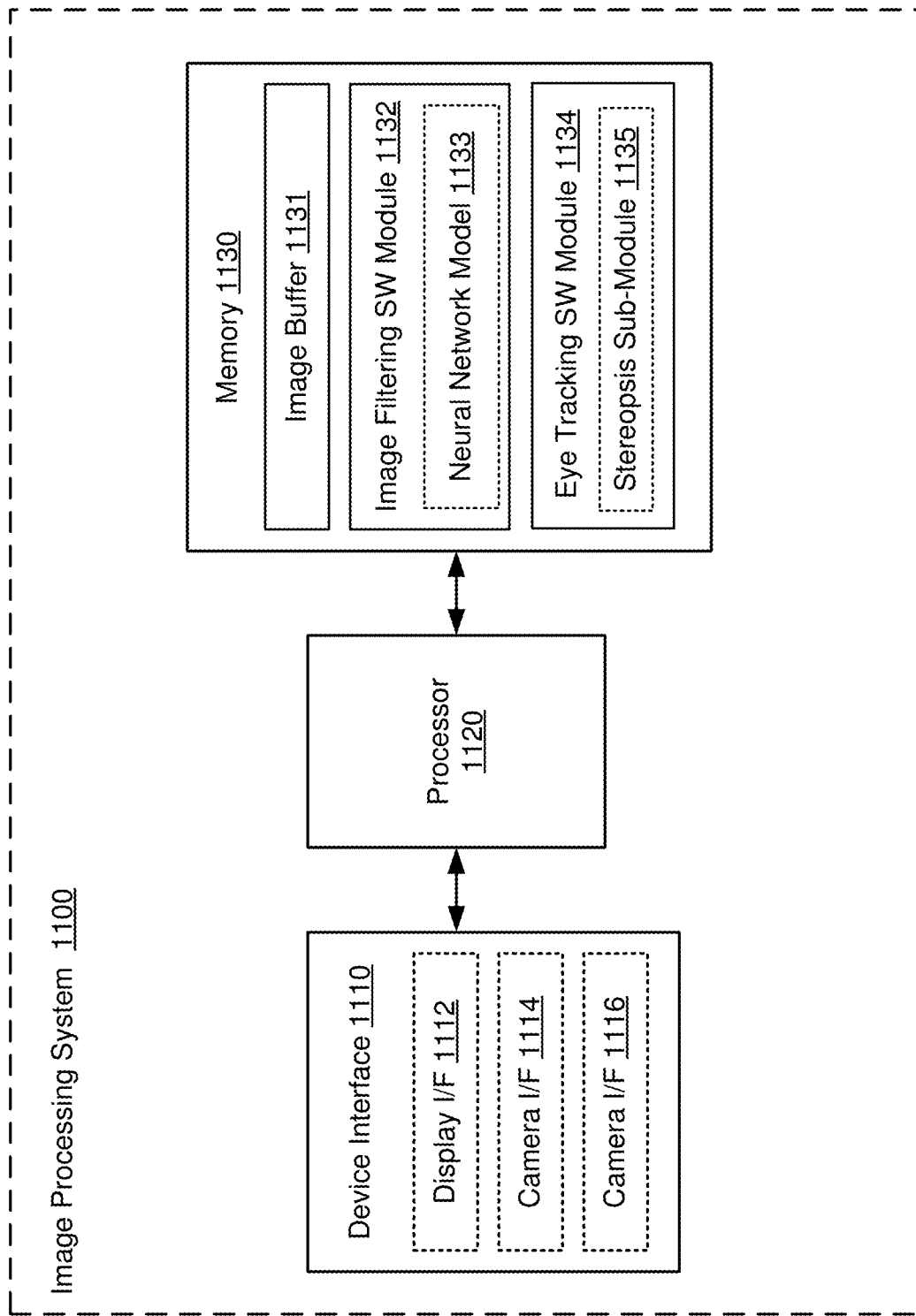
FIG. 11 shows a block diagram of an image processing system, in accordance with some embodiments.

FIG. 11 shows a block diagram of an image processing system 1100, in accordance with some embodiments. The image processing system 1100 includes a device interface 1110, a processor 1120, and a memory 1130. For purposes of discussion herein, the processor 1120 is shown in FIG. 11 as being coupled to the device interface 1110 and the memory 1130. For actual embodiments, the device interface 1110, the processor 1120, and/or the memory 1130 may be connected together using one or more buses (not shown for simplicity). In some embodiments, the image processing system 1100 may be an application specific integrated circuit (ASIC) or other integrated circuit (IC) of any, or a combination of, the electronic systems 100A-300B of FIGS. 1A-3B, HMDs 400A and 400B of FIGS. 4A and 4B, and electronic systems 500-800 of FIGS. 5-8.

The device interface 1110 may transmit and receive signals to and from input devices including, but not limited to, one or more cameras (not shown for simplicity) and/or a display. In some embodiments, the device interface 1110 may include camera interfaces 1114 and 1116 (or an interface for each camera of the image processing system 1100). Each camera interface 1114 and 1116 may be used to communicate with a different camera. For example, the first camera interface 1114 may transmit activation signals to, and receive sensor information from, a first camera to capture images of an object or scene. Further, the second camera interface 1116 may transmit activation signals to, and receive sensor information from, a second camera to capture images of the same object and/or scene, or a different object and/or scene. In some embodiments, the device interface 1110 may further include display interface 1112. The display interface 1112 may be used to communicate with a display and/or to provide a visual interface to a user of the image processing system 1100 (display not shown for simplicity).

The memory 1130 may include an image buffer 1131 to store images received via the camera interfaces 1114 and/or 1116. The memory 1130 may also include a non-transitory computer-readable medium (e.g., one or more nonvolatile memory elements, such as EPROM, EEPROM, Flash memory, a hard drive, and so on) that may store at least the following SW modules:
- an image filtering SW module 1132 (also referred to herein as an "image filter") to filter images received via the camera interfaces 1114 and/or 1116, the image filtering SW module 1132 further including:
  - a neural network model 1133 to filter, reduce, or eliminate noise or interference from images received via the camera interfaces 1114 and/or 1116; and
- an eye tracking SW module 1134 (also referred to herein as an "eye tracking module") to analyze images received via the camera interfaces 1114 and/or 1116 and/or the image filtering SW module 1132, to detect at least one eye of a user in the images, and to determine information including the eye's position, orientation, movement, gaze direction, and point of gaze. The eye tracking SW module 1134 further includes:
  - a stereopsis sub-module 1035 to extract depth information from a pair of images received via the camera interfaces 1114 and 1116.

Each SW module includes instructions that, when executed by processor 1120, cause the image processing system 1100 to perform the corresponding functions.

For example, the processor 1120 may execute the image filtering SW module 1132 to filter images received via the camera interfaces 1114 and/or 1116. In executing the image filtering SW module 1132, the processor 1120 may use the neural network model 1133 or other algorithm to filter, reduce, or eliminate noise (such as a screen door effect) or interference from images received via the camera interfaces 1114 and/or 1116.

The processor 1120 may further execute the eye tracking SW module 1134 to analyze images from the image filtering SW module 1132 (or unfiltered images from the camera interfaces 1114 and/or 1116). In executing the eye tracking SW module 1134, the processor 1120 may, in some aspects, use a neural network model or other algorithm (not shown for simplicity) to detect and track at least one eye of a user. Further, in executing the eye tracking SW module 1134, the processor 1120 may, in some aspects, use the stereopsis sub-module 1135 to extract depth information about a user's eye(s) from a pair of images received via the camera interfaces 1114 and 1116. As noted above, the eye tracking SW module 1134 may determine information such as the eye's (or eyes') position, orientation, movement, gaze direction, and point of gaze, for eye tracking.

Figure 12:
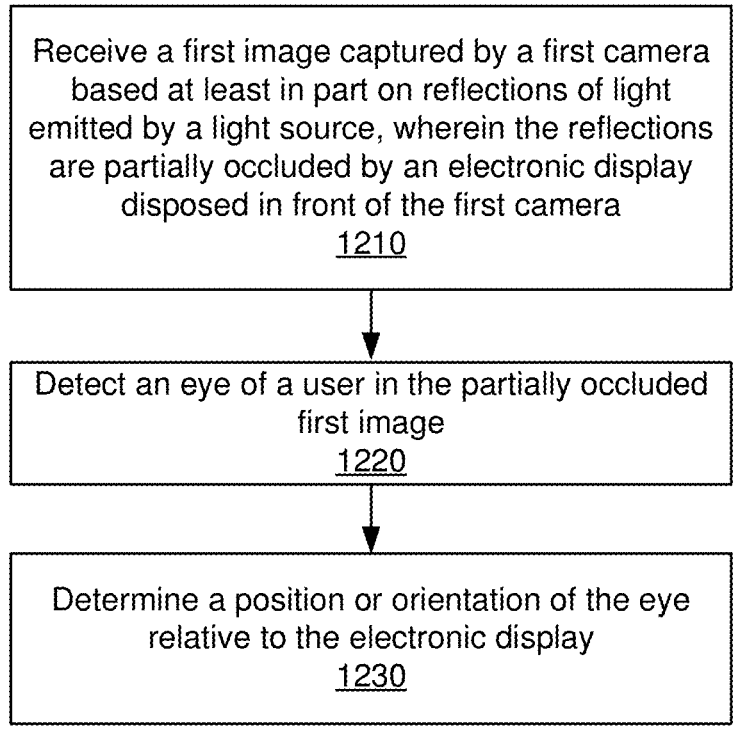
FIG. 12 shows an illustrative flowchart depicting an example method for eye tracking, in accordance with some embodiments.

FIG. 12 shows an illustrative flowchart depicting an example method 1200 for eye tracking using an under-display camera, in accordance with some embodiments. The method 1200 may be performed by any, or a combination of, the electronic systems 100A-300B of FIGS. 1A-3B, HMDs 400A and 400B of FIGS. 4A and 4B, and electronic systems 500-800 of FIGS. 5-8.

As an illustrative example, the method 1200 may be performed by the electronic system 100A of FIG. 1A. The electronic system 100A may receive a first image (e.g., of a user's eye) captured by a first camera (1210). The first image may be based at least in part on reflections of light (e.g., IR, visible, and/or UV light) emitted by a light source. Further, the reflections may be partially occluded by an electronic display disposed in front of the first camera. In some aspects, the occlusions may be display pixels and/or display subpixels in the electronic display. In some embodiments, the electronic system 100A may capture two or more images through two or more cameras.

The electronic system 100A may detect the eye of the user in the partially occluded first image (1220). The electronic system 100A may use, for example, an eye tracking module to perform the detection. In some embodiments, the electronic system 100A may process images from one or more cameras through an image filter to filter, remove or eliminate, at least in part, noise, or interference from the images.

The electronic system 100A may determine a position and/or orientation of the eye relative to the electronic display (1230). The electronic system 100A may use, for example, data from the eye tracking module and/or the image filtering module, to determine the position and/or orientation of the eye. Further, the position and/or orientation of the eye may correspond to the user's gaze direction and/or point of gaze. In some embodiments, the electronic system 100A may determine the user's gaze direction and/or point of gaze using images from two or more cameras and for both of the user's eyes.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, embodiments have been described with reference to specific examples thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method comprising:
    receiving a first image captured by a first camera based at least in part on reflections of light emitted by a light source, wherein the reflections are partially occluded by an electronic display disposed in front of the first camera;
    filtering the first image using a neural network model trained to recognize occlusions from the electronic display;
    detecting a first eye of a user in the filtered first image; and
    determining a position or orientation of the first eye relative to the electronic display.

2. The method of claim 1, further comprising:
    emitting infrared (IR) light from the light source, wherein the first camera is configured to detect the IR light.

3. The method of claim 1, further comprising:
    emitting visible light from the light source, wherein the first camera is configured to detect the visible light.

4. The method of claim 1, further comprising:
    determining a gaze direction of the first eye, wherein the gaze direction corresponds to the position or the orientation of the first eye.

5. The method of claim 4, further comprising:
    identifying a display pixel of the electronic display, wherein the display pixel is aligned with the gaze direction or the orientation of the first eye.

6. The method of claim 1, further comprising:
    focusing first light emitted by the electronic display via a first lens; and
    focusing second light emitted by the electronic display via a second lens.

7. The method of claim 1, further comprising:
    receiving a second image captured by a second camera proximate to the electronic display.

8. The method of claim 7, further comprising:
    filtering the second image using the neural network model.

9. The method of claim 1, further comprising:
    detecting a second eye of the user in the filtered first image; and
    determining a position or orientation of the second eye relative to the electronic display.

10. The method of claim 9, further comprising:
    identifying a first display pixel, of the electronic display, that is aligned with the orientation of the first eye; and
    verifying that the first display pixel is aligned with the orientation of the first eye based at least in part on the orientation of the second eye.

11. A device comprising:
    an electronic display;
    a first camera disposed behind the electronic display, the first camera configured to detect reflections of light emitted by a light source and to capture a first image based at least in part on the reflections, wherein the reflections are partially occluded by the electronic display;
    an image filter configured to filter the first image using a neural network model trained to recognize occlusions from the electronic display; and
    an eye tracking module configured to detect a first eye of a user in the filtered first image, and to determine a position or orientation of the first eye relative to the electronic display.

12. The device of claim 11, wherein the light source is configured to emit infrared (IR) light, and the first camera is configured to detect the IR light.

13. The device of claim 11, wherein the light source is configured to emit visible light, and the first camera is configured to detect the visible light.

14. The device of claim 11, wherein the eye tracking module is further configured to determine a gaze direction of the first eye, the gaze direction corresponding to the position or the orientation of the first eye.

15. The device of claim 14, wherein the eye tracking module is further configured to identify a display pixel of the electronic display, the display pixel aligned with the gaze direction or the orientation of the first eye.

16. The device of claim 11, further comprising:
    a first lens configured to focus first light emitted by the electronic display;
    a second lens configured to focus second light emitted by the electronic display; and
    a housing that couples the first lens to the second lens and the electronic display.

17. The device of claim 11, further comprising:
    a second camera proximate to the electronic display, the second camera configured to capture a second image.

18. The device of claim 17, wherein the image filter is further configured to filter the second image using the neural network model.

19. The device of claim 11, wherein the eye tracking module is further configured to:
    detect a second eye of the user in the filtered first image; and
    determine a position or orientation of the second eye relative to the electronic display.

20. The device of claim 19, wherein the eye tracking module is further configured to:
    identify a first display pixel, of the electronic display, that is aligned with the orientation of the first eye; and
    verify that the first display pixel is aligned with the orientation of the first eye based at least in part on the orientation of the second eye.

21. A processing system comprising:
    a processor; and
    a memory storing instructions that, when executed by the processor, cause the processing system to:
    receive an image captured by a camera based at least in part on reflections of light emitted by a light source, wherein the reflections are partially occluded by an electronic display disposed in front of the camera;
filter the image using a neural network model trained to recognize occlusions from the electronic display;
detect an eye of a user in the filtered image; and
determine a position or orientation of the eye relative to the electronic display.

22. The processing system of claim 21, wherein execution of the instructions causes the processing system to further:
emit infrared (IR) light from the light source, wherein the camera is configured to detect the IR light.

\* \* \* \* \*